United States Patent
Hoshida et al.

(10) Patent No.: US 10,677,587 B2
(45) Date of Patent: Jun. 9, 2020

(54) METHOD FOR MEASURING CURL IN SEPARATOR, SLIT DEVICE, AND CURL MEASUREMENT DEVICE

(71) Applicant: Sumitomo Chemical Company, Limited, Tokyo (JP)

(72) Inventors: Daijiro Hoshida, Niihama (JP); Hiroko Nakashima, Niihama (JP); Takahiro Okugawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 149 days.

(21) Appl. No.: 16/072,787

(22) PCT Filed: Jan. 27, 2017

(86) PCT No.: PCT/JP2017/002989
§ 371 (c)(1),
(2) Date: Jul. 25, 2018

(87) PCT Pub. No.: WO2017/131180
PCT Pub. Date: Aug. 3, 2017

(65) Prior Publication Data
US 2019/0033066 A1  Jan. 31, 2019

(30) Foreign Application Priority Data
Jan. 29, 2016  (JP) ................................. 2016-016003

(51) Int. Cl.
*G01B 11/26* (2006.01)
*G01B 11/255* (2006.01)
(Continued)

(52) U.S. Cl.
CPC .............. *G01B 11/255* (2013.01); *B26D 7/14* (2013.01); *G01B 11/02* (2013.01); *G01B 11/046* (2013.01);
(Continued)

(58) Field of Classification Search
CPC ................................................... G01B 11/255
(Continued)

(56) References Cited

U.S. PATENT DOCUMENTS 5,667,911 A * 9/1997 Yu ........................... B29C 55/06
429/144
5,952,120 A * 9/1999 Yu ....................... H01M 2/1653
429/144
(Continued)

FOREIGN PATENT DOCUMENTS

JP     H07025532 A    1/1995
JP     H11037704 A    2/1999
(Continued)

OTHER PUBLICATIONS

English Translation of International Preliminary Report on Patentablility dated Jul. 31, 2018 in International Application No. PCT/JP2017/002989.
(Continued)

*Primary Examiner* — Tarifur R Chowdhury
*Assistant Examiner* — Omar H Nixon
(74) *Attorney, Agent, or Firm* — Panitch Schwarze Belisario & Nadel LLP

(57) ABSTRACT

In regard to at least one of long separator sheets (12*a*, 12*b*), measurement is carried out to measure the amount of curl at an edge of the at least one of the long separator sheets (12*a*, 12*b*) while applying tension to the at least one of the long separator sheets (12*a*, 12*b*) in the lengthwise direction (MD) of the at least one of the long separator sheets (12*a*, 12*b*), the edge being parallel to the lengthwise direction (MD) of the at least one of the long separator sheets (12*a*, 12*b*). This makes it possible to provide a method of measuring the amount of curl in a separator, a slitting apparatus, and a curl amount measuring apparatus, each of which is capable of
(Continued)

carrying out a highly accurate nondestructive measurement of the amount of curl without having to cut a sample from a long separator sheet.

12 Claims, 10 Drawing Sheets

(51) Int. Cl.

| | | |
|---|---|---|
| H01M 2/14 | (2006.01) |
| G01B 11/04 | (2006.01) |
| G01B 11/24 | (2006.01) |
| H01M 2/16 | (2006.01) |
| B26D 7/14 | (2006.01) |
| G01B 11/02 | (2006.01) |
| H01M 10/0525 | (2010.01) |
| H01M 10/058 | (2010.01) |
| H01M 2/18 | (2006.01) |

(52) U.S. Cl.
CPC ......... *G01B 11/2433* (2013.01); *H01M 2/145* (2013.01); *H01M 2/1686* (2013.01); *B65H 2301/4148* (2013.01); *H01M 2/1673* (2013.01); *H01M 2/18* (2013.01); *H01M 10/058* (2013.01); *H01M 10/0525* (2013.01)

(58) Field of Classification Search
USPC ........................................... 356/635
See application file for complete search history.

(56) References Cited

U.S. PATENT DOCUMENTS

| | | | | |
|---|---|---|---|---|
| 6,143,441 A | * | 11/2000 | Zguris ................ | H01M 2/1613 |
| | | | | 429/144 |
| 2002/0132162 A1 | | 9/2002 | Takata et al. | |
| 2008/0092702 A1 | * | 4/2008 | Gass .................... | B23D 59/001 |
| | | | | 83/13 |
| 2014/0220402 A1 | * | 8/2014 | Ueki .................... | H01M 2/166 |
| | | | | 429/94 |
| 2014/0377630 A1 | | 12/2014 | Kawakami et al. | |
| 2015/0055996 A1 | * | 2/2015 | Maeda ............... | G03G 15/6576 |
| | | | | 399/406 |
| 2016/0268570 A1 | | 9/2016 | Wang et al. | |
| 2018/0013118 A1 | | 1/2018 | Kawakami et al. | |

FOREIGN PATENT DOCUMENTS

| | | |
|---|---|---|
| JP | 2002137858 A | 5/2002 |
| JP | 2002273684 A | 9/2002 |
| JP | 201526609 A | 2/2015 |
| JP | 2015110744 A | 6/2015 |

OTHER PUBLICATIONS

International Search Report dated Apr. 11, 2017 in International Application No. PCT/JP2017/002989 (English Translation).

* cited by examiner

| VALUE OF AMOUNT OF CURL OBTAINED BY IN-LINE MEASUREMENT | VALUE OF AMOUNT OF CURL OBTAINED BY CONVENTIONAL METHOD |
|---|---|
| 0.07mm | 15mm |
| 0.43mm | UNMEASURABLE |
| 0.13mm | UNMEASURABLE |

METHOD FOR MEASURING CURL IN SEPARATOR, SLIT DEVICE, AND CURL MEASUREMENT DEVICE

CROSS-REFERENCE TO RELATED APPLICATION

This application is a Section 371 of International Application No. PCT/JP2017/002989, filed Jan. 27, 2017, which was published in the Japanese language on Aug. 3, 2017, under International Publication No. WO 2017/131180 A1, which claims priority under 35 U.S.C. § 119(b) to Japanese Patent Application No. 2016-016003, filed on Jan. 29, 2016, the disclosures of which are incorporated herein by reference in their entireties.

TECHNICAL FIELD

The present invention relates to a method of measuring the amount of curl in a long separator sheet which has been obtained through slitting and which is for use in a battery such as a lithium ion battery, a slitting apparatus capable of measuring the amount of curl in the long separator sheet obtained through slitting, and a curl amount measuring apparatus.

BACKGROUND ART

An original sheet of separator for use in a battery, such as a lithium ion battery, can be slit along a lengthwise direction of the separator original sheet into a plurality of long separator sheets. The long separator sheets each have a certain slit width that is orthogonal to the lengthwise direction.

Each of the long separator sheets is wound around a core to form a separator roll, and the separator roll is supplied to a battery production process. In the battery production process, the long separator sheet is cut to have a certain length in a direction orthogonal to the slit width, and is used as a separator.

However, it has been known that a long separator sheet like above becomes curled at an edge resulted from slitting or at an edge parallel to the slit width, in a manner such that the edge lifts up or that the edge lifts up and becomes curled into a roll. A long separator sheet in which the amount of such curl is greater than a certain value is difficult to use as a separator in the battery production process.

Therefore, knowing the amount of curl in a long separator sheet of a separator roll is very important in order to judge the quality of the separator, and many attempts have conventionally been done to measure the amount of curl.

For example, Patent Literatures 1 and 2 disclose measuring the amount of curl by: cutting, from a long separator sheet, a sample having a size of 300 mm in machine direction (MD) (which is the lengthwise direction of the long separator sheet) and 200 mm in transverse direction (TD) (which is a direction orthogonal to the lengthwise direction of the long separator sheet); and measuring the maximum distance from a flat surface on which the sample is placed to a lifted edge of the sample with the use of a graduated ruler.

(a) of FIG. 13 is an illustration of a conventional method, which is disclosed by Patent Literature 1, to measure the amount of curl at an edge that is parallel to the TD. (b) of FIG. 13 is a table showing judgements of whether a battery separator is acceptable or unacceptable according to the amount of curl thus measured.

As illustrated in (a) of FIG. 13, in the conventional method of measuring the amount of curl disclosed by Patent Literature 1, the amount of curl in each of samples A to D is determined by measuring the maximum distance from a flat surface on which the sample A, B, C, or D is placed to a lifted edge with the use of a graduated ruler. In this method, in a case where the sample is apparently curled in the MD into a roll like samples C and D, the amount of curl is regarded as large and unmeasurable. In regard to samples C and D, sample D is apparently curled to a greater extent than sample C. Therefore, the amount of curl increases in the order of sample A<sample B<sample C<sample D.

As shown in (b) of FIG. 13, whether the separator is acceptable or unacceptable as a separator for a laminated-type battery or a wound-type battery is determined according to the above amount of curl at the edge parallel to the TD. The laminated-type battery is a battery in which a positive electrode, a separator, and a negative electrode are stacked together. The wound-type battery is a battery in which a stack of a positive electrode, a separator, and a negative electrode is rolled in a roll.

In a laminated-type battery, the separator is placed on the positive electrode or the negative electrode such that the separator covers the positive electrode or the negative electrode. Using a separator curled to the extent of sample A in a laminated-type battery is not particularly an issue; however, in a case where the separator is curled to the extent of sample B, C, or D, the separator hardly functions because some portion between the positive electrode and the negative electrode has doubly stacked separator layers and another portion has no separator therein.

On the other hand, in a wound-type battery, the separator, which lies between the positive electrode and the negative electrode, is rolled in the MD with tension applied thereto together with the positive electrode and the negative electrode. Therefore, using a separator curled to the extent of sample A, B, or C is not particularly an issue. However, in a case where the separator is curled to the extent of sample D, the separator is difficult to use because this separator is difficult to roll.

As described earlier, the amount of curl at an edge parallel to the TD is important in order to judge the quality of a separator; however, in a wound-type battery, the separator is rolled in the MD with tension applied thereto, and therefore the amount of curl at an edge parallel to the MD is of more importance than the amount of curl at an edge parallel to the TD. In view of this, it is more important to know the amount of curl at an edge parallel to the MD in order to judge the quality of the separator.

Patent Literature 2 discloses measuring the amount of curl at an edge parallel to the MD, as well as the amount of curl at an edge parallel to the TD, by cutting, from a long separator sheet, a sample having a size of 300 mm in the MD and 200 mm in the TD, by a method similar to the method disclosed by Patent Literature 1.

CITATION LIST

Patent Literature

[Patent Literature 1]

Japanese Patent Application Publication, Tokukai, No. 2015-26609 (Publication date: Feb. 5, 2015)

[Patent Literature 2]

Japanese Patent Application Publication, Tokukai, No. 2015-110744 (Publication date: Jun. 18, 2015)

SUMMARY OF INVENTION

Technical Problem

However, the methods of measuring the amount of curl disclosed by Patent Literatures 1 and 2 necessitate cutting, from a long separator sheet, a sample having a size of 300 mm in the MD and 200 mm in the TD. That is, the conventional methods of measuring the amount of curl are methods of destructive measurements. Therefore, the cut long separator sheet, after being used for measurement of the amount of curl, is not usable as a product.

It should be noted that the destructive measurement of the amount of curl is a measurement method that necessitates cutting a sample having a certain size from a long separator sheet, whereas a nondestructive measurement of the amount of curl is a measurement method that does not necessitate cutting a sample from a long separator sheet.

Therefore, by the conventional methods of measuring the amount of curl, it is difficult to measure the amount of curl in all the long separator sheets or to measure the amount of curl throughout the entire length of one long separator sheet.

Furthermore, the methods of measuring the amount of curl disclosed by Patent Literatures 1 and 2 are for a laminated-type battery, and have an issue in that the amount of curl in a strongly curled separator cannot be measured. Specifically, by the conventional methods of measuring the amount of curl, it is not possible to accurately measure the difference in amount of curl between sample C and sample D illustrated in (a) of FIG. 13. Especially in a case of a wound-type battery, a relatively strongly curled separator may be used. Therefore, such conventional methods of measuring the amount of curl are difficult to use in measuring the amount of curl in a separator, for a wound-type battery, which is relatively strongly curled.

The present invention was made in view of the above issues, and an object thereof is to provide a method of measuring the amount of curl in a separator, a slitting apparatus, and a curl amount measuring apparatus, each of which is capable of carrying out a highly accurate nondestructive measurement of the amount of curl even in a case where the amount of curl is relatively large, without having to cut a sample from a long separator sheet.

Solution to Problem

In order to attain the above object, a method of measuring an amount of curl in a separator of the present invention is a method of measuring an amount of curl in a separator, the method including: a step of, in regard to at least one of long separator sheets which resulted from slitting of a separator original sheet along a lengthwise direction of the separator original sheet, measuring an amount of curl at an edge of the at least one of the long separator sheets while applying tension to the at least one of the long separator sheets in a lengthwise direction of the at least one of the long separator sheets, the edge being parallel to the lengthwise direction of the at least one of the long separator sheets.

According to the above method, in regard to at least one of the long separator sheets, the amount of curl at an edge (edge parallel to the lengthwise direction) of the at least one of the long separator sheets is measured while applying tension to the at least one of the long separator sheets in the lengthwise direction of the at least one of the long separator sheets. This makes it possible to carry out a highly accurate nondestructive measurement of the amount of curl even in a case where the amount of curl is relatively large, without having to cut a sample from the long separator sheet.

Thus, this method makes it possible to measure the amount of curl in all the long separator sheets or to measure the amount of curl throughout the entire length of one long separator sheet.

In order to attain the above object, a slitting apparatus of the present invention includes: a slitting section configured to slit a separator original sheet along a lengthwise direction of the original sheet into long separator sheets; and a winding section configured to wind the long separator sheets around respective cores, the slitting apparatus including: a transferring section configured to transfer the long separator sheets from the slitting section to the winding section while tension is being applied to the long separator sheets in a lengthwise direction of the long separator sheets; and a measuring apparatus configured to measure, in the transferring section, a width of at least one of the long separator sheets, the width being a distance between opposite edges, each of which extends parallel to the lengthwise direction of the at least one of the long separator sheets, of the at least one of the long separator sheets.

According to the above arrangement, the slitting apparatus includes: a transferring section configured to transfer the long separator sheets from the slitting section to the winding section while tension is being applied to the long separator sheets in the lengthwise direction of the long separator sheets; and a measuring apparatus configured to measure, in the transferring section, a width of at least one of the long separator sheets, the width being a distance between opposite edges, each of which extends parallel to the lengthwise direction of the at least one of the long separator sheets, of the at least one of the long separator sheets.

Thus, according to the above arrangement, in regard to at least one of the long separator sheets, the amount of curl at an edge (edge parallel to the lengthwise direction) of the at least one of the long separator sheets can be measured while applying tension to the at least one of the long separator sheets in the lengthwise direction of the at least one of the long separator sheets. This makes it possible to carry out a highly accurate nondestructive measurement of the amount of curl even in a case where the amount of curl is relatively large, without having to cut a sample from the long separator sheet.

In order to attain the above object, a curl amount measuring apparatus of the present invention includes: a first roller for attaching a separator roll thereon, the separator roll being constituted by (i) a core and (ii) a long separator sheet, which resulted from slitting of a separator original sheet along a lengthwise direction of the separator original sheet, wound around the core; a stopper, a second roller, and a tension applying part each of which serves to apply tension, in a lengthwise direction of the long separator sheet, to the long separator sheet unwound from the separator roll, the stopper being configured to stop rotation of the separator roll on the first roller; and a measuring apparatus configured to measure a width of the long separator sheet unwound from the separator roll while tension is being applied to the long separator sheet in the lengthwise direction of the long separator sheet, the width being a distance between opposite edges, each of which extends parallel to the lengthwise direction of the long separator sheet, of the long separator sheet.

According to the above arrangement, the curl amount measuring apparatus includes: a stopper, a second roller, and a tension applying part each of which serves to apply tension, in a lengthwise direction of the long separator sheet, to the long separator sheet unwound from the separator roll, the stopper being configured to stop rotation of the separator roll on the first roller; and a measuring apparatus configured to measure a width of the long separator sheet unwound from the separator roll while tension is being applied to the long separator sheet in the lengthwise direction of the long separator sheet, the width being a distance between opposite edges, each of which extends parallel to the lengthwise direction of the long separator sheet, of the long separator sheet. This makes it possible to measure the width (distance between opposite edges, each of which extends parallel to the lengthwise direction of the long separator sheet, of the long separator sheet) of the long separator sheet while tension is being applied to the long separator sheet in the lengthwise direction of the long separator sheet. This makes it possible to carry out a highly accurate nondestructive measurement of the amount of curl even in a case where the amount of curl is relatively large, without having to cut a sample from the long separator sheet.

Advantageous Effects of Invention

According to one aspect of the present invention, it is possible to provide a method of measuring the amount of curl in a separator, a slitting apparatus, and a curl amount measuring apparatus, each of which is capable of carrying out a highly accurate nondestructive measurement of the amount of curl even in a case where the amount of curl is relatively large, without having to cut a sample from a long separator sheet.

Figure 11:
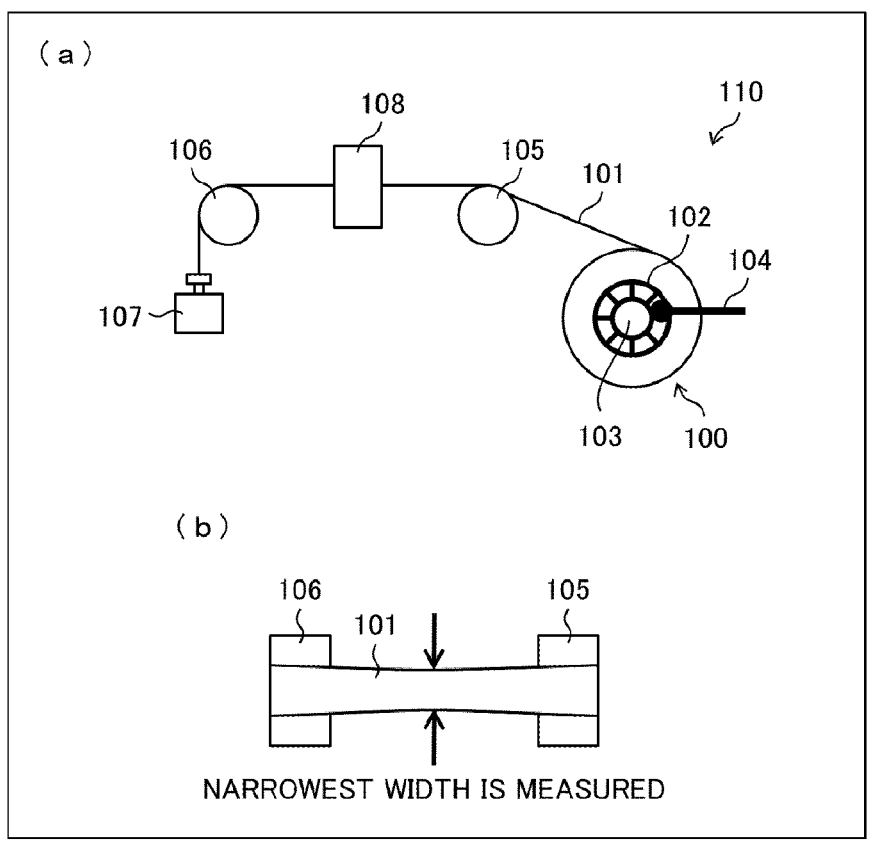

(a) of FIG. 11 schematically illustrates a configuration of a curl amount measuring apparatus, and (b) of FIG. 11 illustrates how the amount of curl at an edge parallel to the MD is measured by using the curl amount measuring apparatus.

Figure 12:
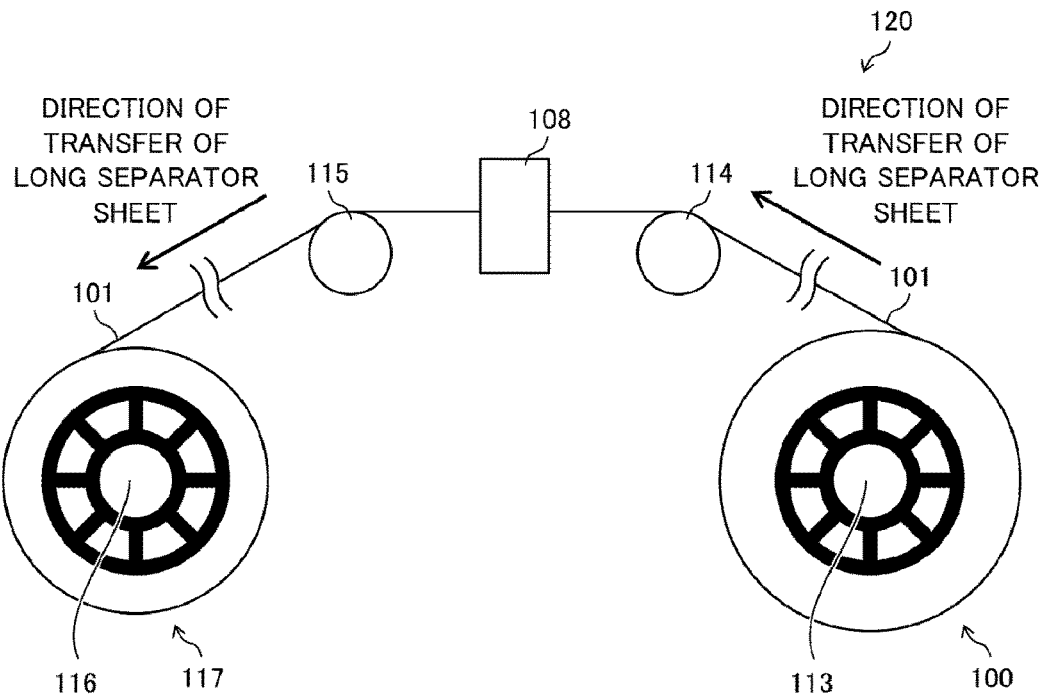

FIG. 12 schematically illustrates a configuration of another curl amount measuring apparatus.

Figure 13:
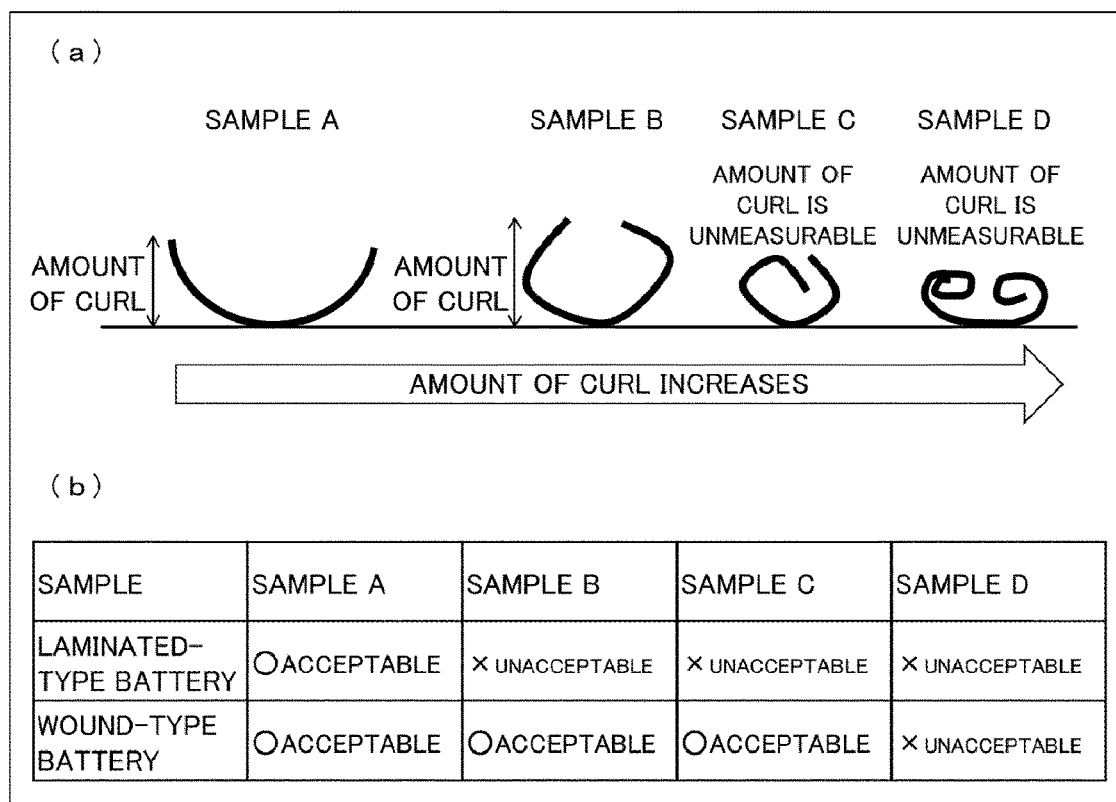

(a) of FIG. 13 is an illustration of a conventional method, which is disclosed by Patent Literature 1, to measure the amount of curl at an edge that is parallel to the TD. (b) of FIG. 13 is a table showing judgements of whether a battery separator is acceptable or unacceptable according to the amount of curl thus measured.

DESCRIPTION OF EMBODIMENTS

[Basic Configuration]

The following description will discusses, in order, a lithium-ion secondary battery, a separator, a heat-resistant separator, a method of producing a heat-resistant separator, and a slitting apparatus.

(Lithium-Ion Secondary Battery)

A nonaqueous electrolyte secondary battery, a lithium-ion secondary battery being a representative example thereof, has a high energy density. Due to this fact, nonaqueous electrolyte secondary batteries are currently widely used in such devices as personal computers, mobile phones, and mobile information terminals, as well as in motorized objects such as automobiles and aircraft. Nonaqueous electrolyte secondary batteries are also widely used as stationary batteries to contribute to a stable supply of power.

Figure 1:
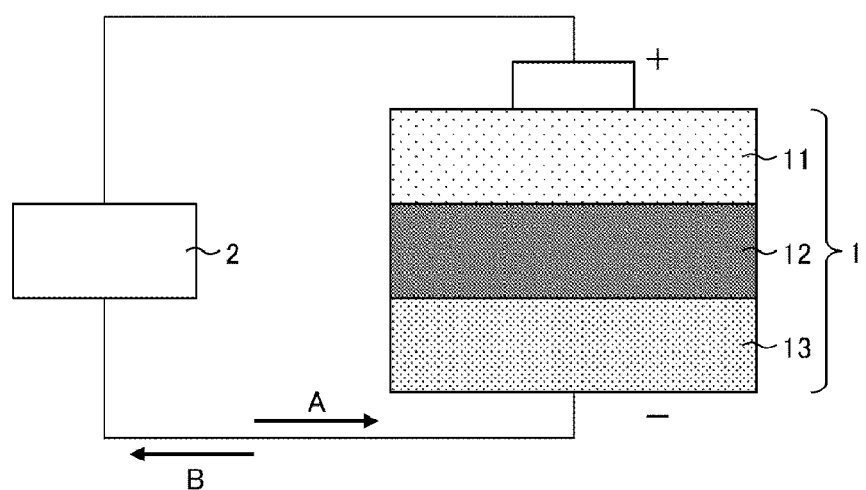
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a positive electrode 11, a separator 12, and a negative electrode 13. Outside the lithium-ion secondary battery 1, an external device 2 is connected to the positive electrode 11 and the negative electrode 13. While the lithium-ion secondary battery 1 is being charged, electrons move in direction A. On the other hand, while the lithium-ion secondary battery 1 is being discharged, electrons move in direction B.

(Separator)

The separator 12 is arranged such that it is sandwiched between the positive electrode 11, which is a cathode of the lithium-ion secondary battery 1, and the negative electrode 13, which is an anode of the lithium-ion secondary battery 1. The separator 12 is a porous film that separates the positive electrode 11 and the negative electrode 13 while allowing lithium ions to move therebetween. The separator 12 contains, for example, a polyolefin such as polyethylene or polypropylene as a component material.

Figure 2:
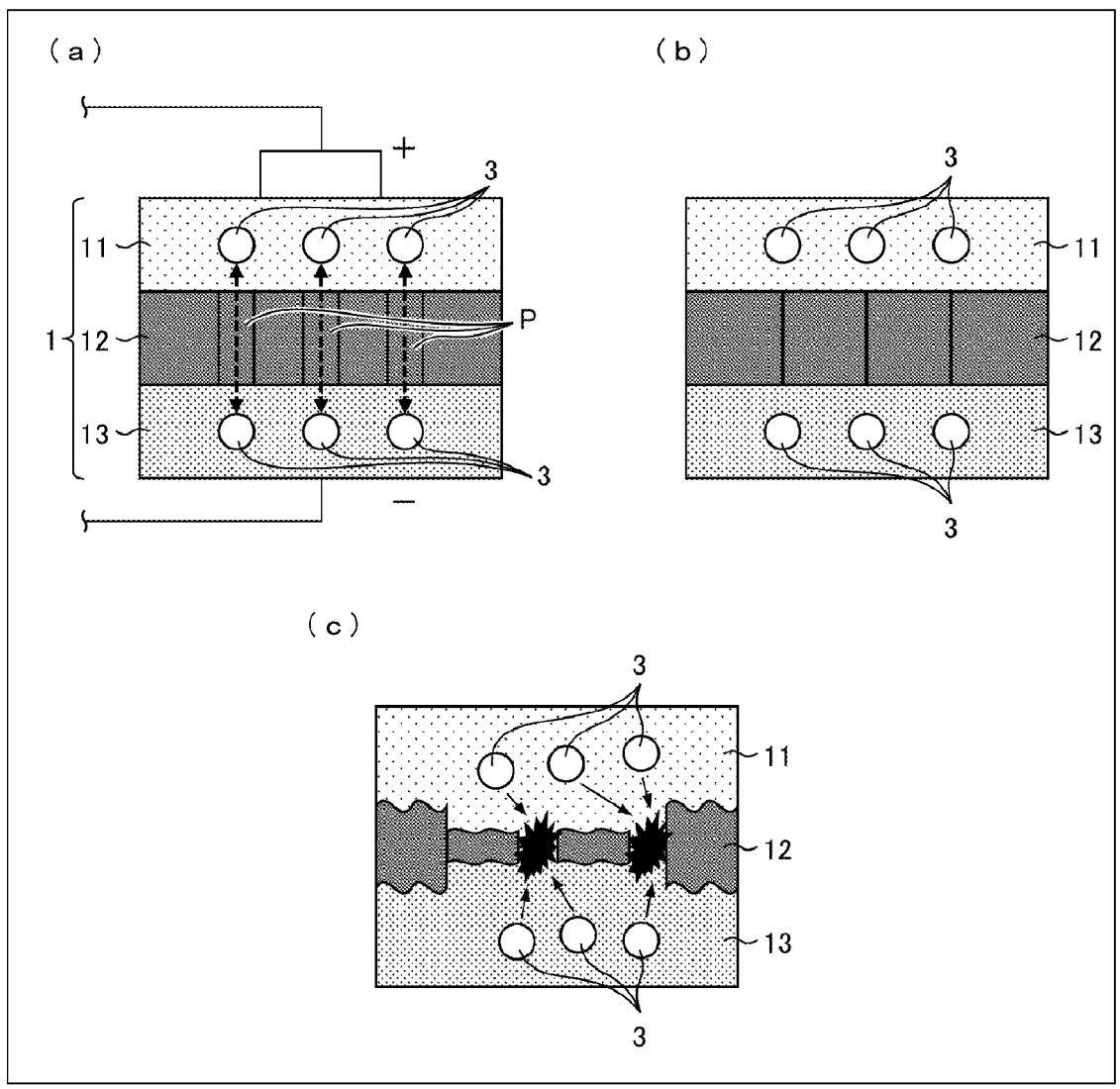
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a configuration of the lithium-ion secondary battery 1 in a normal state. (b) of FIG. 2 illustrates a state in which the temperature of the lithium-ion secondary battery 1 has risen. (c) of FIG. 2 illustrates a state in which the temperature of the lithium-ion secondary battery 1 has risen sharply.

As illustrated in (a) of FIG. 2, the separator 12 is provided with many pores P. Normally, lithium ions 3 in the lithium-ion secondary battery 1 can move back and forth through the pores P.

Note, here, that there are cases in which the temperature of the lithium-ion secondary battery 1 rises due to, for example, excessive charging of the lithium-ion secondary battery 1, a high current caused by short-circuiting of the external device, or other such causes. In such cases, the separator 12 melts or softens, and the pores P are blocked, as illustrated in (b) of FIG. 2. As a result, the separator 12 shrinks. This stops the abovementioned movement of the lithium ions 3, and consequently stops the abovementioned temperature rise.

However, in a case where the temperature of the lithium-ion secondary battery 1 rises sharply, the separator 12 shrinks suddenly. In such a case, as illustrated in (c) of FIG. 2, the separator 12 may be destroyed. The lithium ions 3 would then leak out from the destroyed separator 12. As a result, the lithium ions 3 do not stop moving. Consequently, the temperature of the battery continues rising.

(Heat-Resistant Separator)

Figure 3:
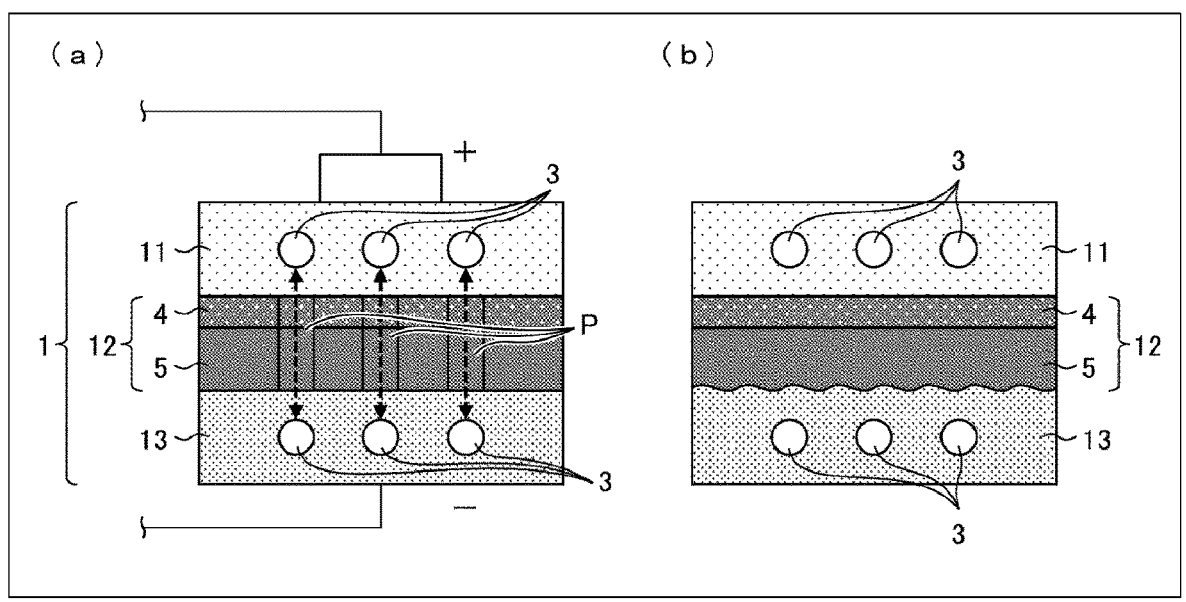
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a configuration of the lithium-ion secondary battery 1 in a normal state, and (b) of FIG. 3 illustrates a state in which the temperature of the lithium-ion secondary battery 1 has risen sharply.

As illustrated in (a) of FIG. 3, the separator 12 may be a heat-resistant separator that includes a porous film 5 and a heat-resistant layer 4. The heat-resistant layer 4 is layered upon one surface of the porous film 5, the one surface being on the positive electrode 11 side. Note that the heat-resistant layer 4 can alternatively be layered upon one surface of the porous film 5, the one surface being on the negative electrode 13 side, or upon both surfaces of the porous film 5. The heat-resistant layer 4 is provided with pores which are similar to the pores P of the separator 12. Normally, the lithium ions 3 move back and forth through the pores P of the separator 12 and the pores of the heat-resistant layer 4. The heat-resistant layer 4 contains, for example, a wholly aromatic polyamide (aramid resin) as a component material.

As illustrated in (b) of FIG. 3, even in a case where the temperature of the lithium-ion secondary battery 1 sharply rises and, the porous film 5 melts or softens as a result, the shape of the porous film 5 is maintained because the heat-resistant layer 4 supports the porous film 5. Therefore, such a sharp temperature rise would result in only melting or softening of the porous film 5 and consequent blocking of the pores P. This stops movement of the lithium ions 3 and consequently stops the above-described excessive discharging or excessive charging. In this way, destruction of the separator 12 can be prevented.

(Steps of Production of Heat-Resistant Separator)

A method of producing the heat-resistant separator of the lithium-ion secondary battery 1 is not particularly limited. The heat-resistant separator can be produced using a publicly known method. The following discussion assumes a case where the porous film 5 contains polyethylene as a main component material. However, even in a case where the porous film 5 contains some other material, similar steps can still be used to produce the separator 12.

For example, it is possible to employ a method including (i) a step of forming a film by adding a plasticizer to a thermoplastic resin, and (ii) a subsequent step of removing the plasticizer with an appropriate solvent. For example, in a case where the porous film 5 is made of a polyethylene resin containing ultra-high molecular weight polyethylene, it is possible to produce the porous film 5 via the following method.

This method includes (1) a kneading step in which a polyethylene resin composition is obtained by kneading an ultra-high molecular weight polyethylene and an inorganic filler such as calcium carbonate, (2) a rolling step in which a film is formed with the polyethylene resin composition, (3) a removal step in which the inorganic filler is removed from the film obtained in the step (2) above, and (4) a stretching step in which the porous film 5 is obtained by stretching the film obtained in the step (3) above.

Through the removal step, many fine pores are created in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultra-high molecular weight polyethylene, 5 parts by weight to 200 parts by weight of a low molecular weight polyolefin having a weight-average molecular weight of 10,000 or less, and 100 parts by weight to 400 parts by weight of the inorganic filler may be kneaded.

Thereafter, in a coating step, the heat-resistant layer 4 is formed on a surface of the porous film 5. For example, on the porous film 5, an aramid/NMP (N-methylpyrrolidone) solution (coating solution) is applied, and thereby, the heat-resistant layer 4 that is an aramid heat-resistant layer is formed. The heat-resistant layer 4 may be provided on only one surface or on both surfaces of the porous film 5. The heat-resistant layer 4 may alternatively be formed with a coating using a mixed solution containing a filler such as alumina/carboxymethyl cellulose.

The method for coating the porous film 5 with a coating solution is not particularly limited as long as it is a method that enables uniform wet coating. The method may be a conventional and publicly known method such as a capillary coating method, a spin coating method, a slit die coating method, a spray coating method, a dip coating method, a roll coating method, a screen printing method, a flexo printing method, a bar coater method, a gravure coater method, or a die coater method. The thickness of the heat-resistant layer 4 can be controlled by adjusting (i) the thickness of a coating wet film and (ii) the concentration of solid content in the coating solution.

Note that it is possible to use a resin film, a metal belt, a drum or the like as a support by which the porous film 5 is fixed or transferred during coating.

As described above, it is possible to produce a separator 12 (heat-resistant separator) in which a heat-resistant layer 4 is layered upon a porous film 5. The separator thus produced is wound around a cylindrical core. Note that the object to be produced via the above production method is not limited to being a heat-resistant separator. The above production method does not necessarily include the coating step. In a case where the production method includes no coating step, the object to be produced is a separator including no heat-resistant layer.

The above description dealt with an example case in which the base material of the separator 12 is a film such as a polyolefin film and in which the heat-resistant layer 4, which enhances thermal stability of the separator 12, is provided as a functional layer. Note, however, that this does not imply any limitation. For example, an adhesive layer which enhances adhesion with electrodes may be provided as a functional layer in addition to or instead of the heat-resistant layer 4. That is, the separator 12 may have some additional functional layer other than the heat-resistant layer 4 and, in this case, a coating liquid corresponding to the functional layer may be applied in the coating step.

The following description will discuss a coating liquid for use in a case where the heat-resistant layer 4 is provided as a functional layer to enhance thermal stability of the separator 12. The coating liquid for use in such a case contains a filler, a binder, and a solvent.

Examples of the filler encompass a filler made of organic matter and a filler made of inorganic matter. Specific examples of the filler made of organic matter encompass fillers made of: (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; polyacrylic acid and polymethacrylic acid; and the like. Specific examples of the filler made of inorganic matter encompass fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, glass, and the like. It is possible to use (i) only one kind of filler or (ii) two or more kinds of fillers in combination. Among the above fillers, a filler made of inorganic matter is suitable. A filler made of an inorganic oxide such as silica, calcium oxide, magnesium oxide, titanium oxide, alumina, or boehmite is more preferable. A filler made of at least one kind selected from the group consisting of silica, magnesium oxide, titanium oxide, and alumina is still more preferable. A filler made of alumina or boehmite is particularly preferable. While alumina has many crystal forms such as α-alumina, β-alumina, γ-alumina, and θ-alumina, any of the crystal forms can be used suitably. Among such various alumina crystal forms, α-alumina is most preferable because it is particularly high in thermal stability and chemical stability. The filler has an average particle size preferably of not more than 3 μm, and more preferably of 1 μm. Examples of a shape of the filler encompass a spherical shape, a gourd shape, and the like. An average particle size of the filler can be calculated by, for example, (i) a method in which any 25 particles are selected at a time, respective particle sizes (diameters) of those particles are measured by use of a scanning electron microscope (SEM), and an average of the 25 particle sizes is calculated or (ii) a method in which a BET specific surface area is measured, and an average particle size is calculated by spherical approximation based on the BET specific surface area. In a case where the average particle size is calculated by use of the SEM and the filler has a shape different from a spherical shape, a greatest length of each of particles of the filler is regarded as a particle size. Alternatively, it is also possible to use, in combination, two or more kinds of fillers that differ in particle diameter and/or specific surface area.

A binder resin to be used for formation of the functional layer serves to (i) bind together fillers that constitute the functional layer and (ii) bind a filler and a base film. The binder resin is preferably a resin that is (i) soluble or dispersible in a solvent to be used for a coating solution, (ii) insoluble in an electrolyte of a battery, and (iii) electrochemically stable in normal use of the battery. The binder resin is preferably a water-dispersible polymer or a water-soluble polymer from the viewpoint of a process and/or an environmental impact. This is because such polymers allow an aqueous solvent to be used as a solvent of a coating solution. Note that "aqueous solvent" means a solvent which contains water in an amount of not less than 50% by weight and which contains another solvent (e.g., ethanol) and an additional component provided that neither dispersibility of the water-dispersible polymer nor solubility of the water-soluble polymer is impaired. Examples of the water-dispersible polymer encompass polyolefins such as polyethylene and polypropylene; fluorine-containing resins such as polyvinylidene fluoride and polytetrafluoroethylene; fluorine-containing rubbers such as vinylidene fluoride-hexafluoropropylene copolymer and ethylene-tetrafluoroethylene copolymer; rubbers such as styrene-butadiene copolymer and a hydrogenated one thereof, acrylic acid ester copolymer, methacrylic acid ester copolymer, acrylonitrile-acrylic acid ester copolymer, styrene-acrylic acid ester copolymer, ethylene propylene rubber, and polyvinyl acetate; and resins having a melting point or a glass transition temperature of not less than 180° C., such as polyphenylene ether, polysulfone, polyether sulfone, polyphenylene sulfide, polyetherimide, polyamide imide, polyetheramide, polyamide, and polyester. Acrylic resins such as acrylic acid ester copolymer, methacrylic acid ester copolymer, acrylonitrile-acrylic acid ester copolymer, and styrene-acrylic acid ester copolymer are preferable because these acrylic resins are each high in property of bonding fillers together or bonding a filler and a base film together. Resins having a melting point or a glass transition temperature of not less than 180° C., such as polyphenylene ether, polysulfone, polyether sulfone, polyphenylene sulfide, polyetherimide, polyamide imide, polyetheramide, and polyester are preferable because these resins have high heat resistance and allow better maintenance of a shape of a laminated porous film that is being heated. Among heat-resistant resins, polyetherimide, polyamide imide, polyetheramide, and polyamide are more preferable, and polyamide is still more preferable. Examples of the water-soluble polymer encompass polyvinyl alcohol, polyethylene glycol, cellulose ether, sodium alginate, polyacrylic acid, polyacrylamide, polymethacrylic acid, and the like. Among the water-soluble polymers, cellulose ether is preferable. Specific examples of the cellulose ether encompass carboxymethyl cellulose (CMC), hydroxyethyl cellulose (HEC), carboxy ethyl cellulose, methyl cellulose, ethyl cellulose, cyan ethyl cellulose, oxyethyl cellulose, and the like. Among these cellulose ethers, CMC and HEC, each of which is highly chemically stable, are particularly preferable. In a case where there are salts, examples of the water-soluble polymer also encompass the salts. In a case where a nonaqueous solvent is used, examples of a usable nonaqueous solvent encompass a fluorine-containing resin (e.g., polyvinylidene fluoride), polyvinylidene chloride, polyacrylonitrile, and the like. These binder resins can be used in one kind or can be appropriately mixed to be used in combination of two or more kinds.

As described earlier, a ratio between the filler and the binder resin in the functional layer is appropriately determined in accordance with a purpose of use of the functional layer. Note, however, that a weight ratio of the filler to the binder resin is preferably 1 to 100, and more preferably 2 to 99. Especially in a case where the functional layer is a heat-resistant layer, the weight ratio is preferably 4 to 99.

(Slitting Apparatus)

The heat-resistant separator and the separator including no heat-resistant layer (both types of separator hereinafter referred to as "separator") preferably have a width (hereinafter, "product width") suitable for products in which the separator will be utilized, such as the lithium-ion secondary battery 1. However, in order to improve productivity, the separator is produced so as to have a width that is equal to or larger than the abovementioned product width. This is called a separator original sheet. The separator original sheet, after having been thus produced, is cut (slit) into long separator sheets such that "width of a separator", which refers to a dimension in a direction substantially perpendicular to the lengthwise direction and to the thickness direction of the separator original sheet, of each of the long separator sheets is equal to the "product width".

In the description below, a wide separator having not yet been slit is referred to as a "separator original sheet," while a separator having been slit to have a production width is specifically referred to as a "long separator sheet". Note also that here, the term "slit" means to slit the separator original sheet along the lengthwise direction (the direction of the flow of the film during production; MD: Machine Direction), and that the term "cut" means to cut the long separator sheet along a transverse direction (TD). The transverse direction (TD) means a direction which is substantially perpendicular to the lengthwise direction (MD) and the thickness direction of the long separator sheet.

Embodiment 1

(Configuration of Slitting Apparatus)

Figure 4:
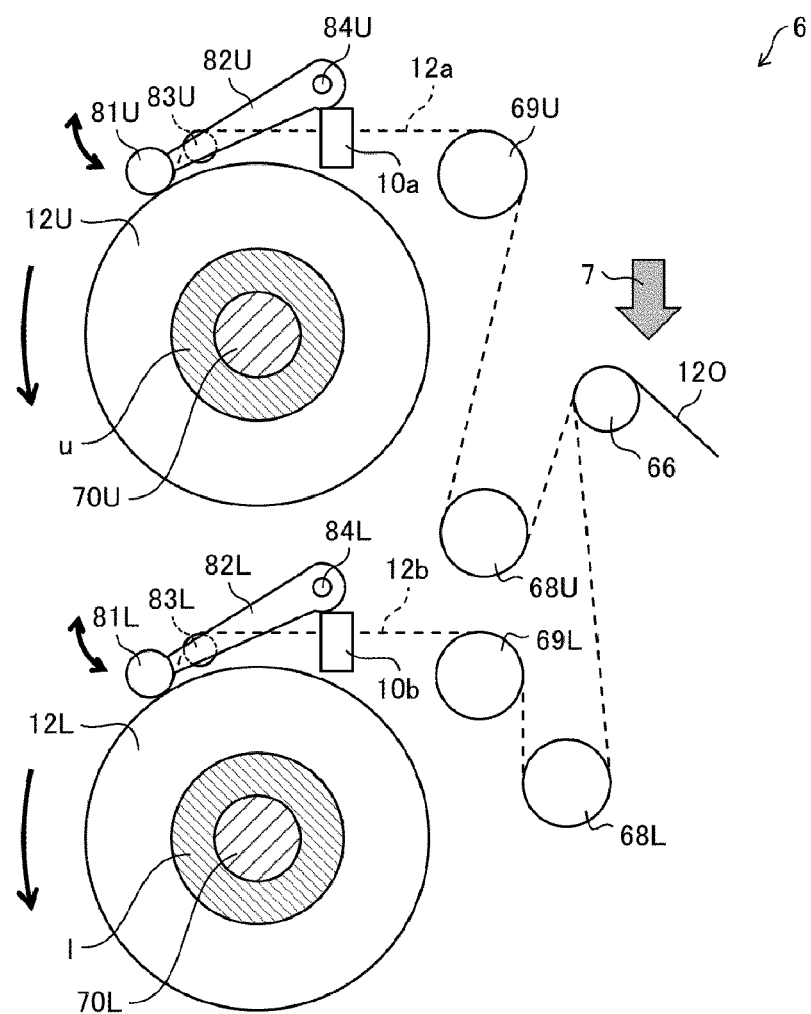
FIG. 4 schematically illustrates a configuration of a slitting apparatus including optical width measuring apparatuses.

FIG. 4 schematically illustrates a configuration of a slitting apparatus 6 including optical width measuring apparatuses 10*a* and 10*b*.

Figure 5:
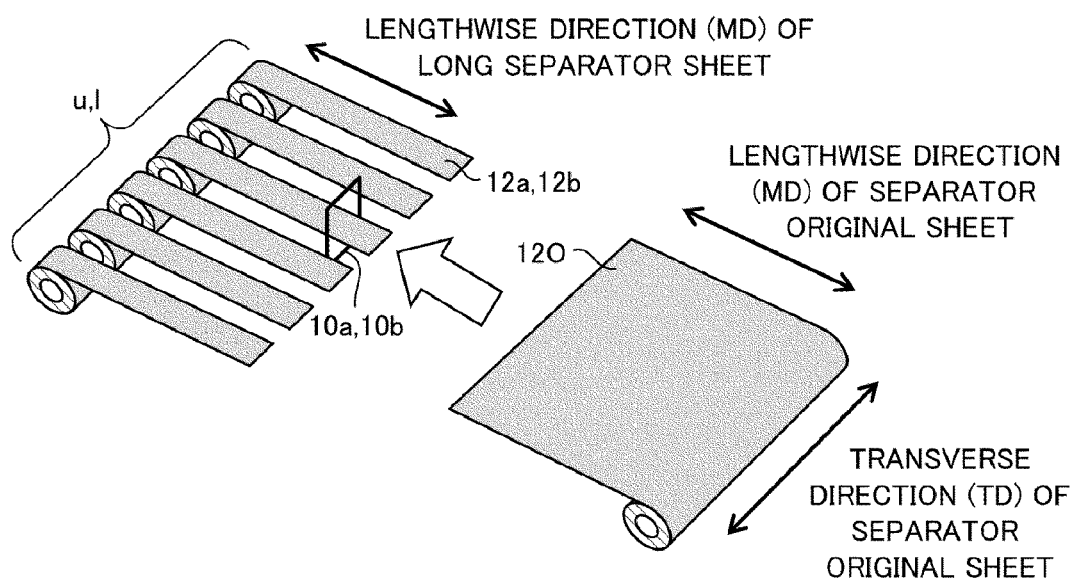
FIG. 5 illustrates how the amount of curl at an edge parallel to the lengthwise direction of one of long separator sheets is measured by the slitting apparatus including the optical width measuring apparatuses illustrated in FIG. 4. The measurement is carried out while the long separator sheets, into which a separator original sheet has been slit by the slitting apparatus, are being transferred.

FIG. 5 illustrates how the amount of curl at an edge parallel to the lengthwise direction (MD) of one of long separator sheets 12*a* or one of long separator sheets 12*b* is measured by the slitting apparatus 6 including the optical width measuring apparatus 10*a* or 10*b*. The measurement is carried out while the long separator sheets 12*a* and the long separator sheets 12*b*, into which a separator original sheet 12O has been slit by the slitting apparatus 6, are being transferred while tension is being applied thereto in their lengthwise direction (MD).

As illustrated in FIG. 4, the slitting apparatus 6 includes: rollers 66, 68U, 68L, 69U, and 69L which are rotatably supported and have a cylindrical shape; a first touch roller 81U; a second touch roller 81L; a first arm 82U; a second arm 82L; a first take-up assisting roller 83U; a second take-up assisting roller 83L; a first wind-up roller 70U; a second wind-up roller 70L; slitting sections (cutting apparatuses) 7; and the optical width measuring apparatuses 10*a* and 10*b*.

The slitting apparatus 6 is supplied with the separator original sheet 12O, which has been unwound from a core having a cylindrical shape as illustrated in FIG. 5.

The separator original sheet 12O thus supplied is, while being transferred, slit into long separator sheets 12*a* and long separator sheets 12*b* illustrated in FIG. 5, by the slitting sections 7 immediately upstream of the roller 66.

(Slitting Section (Cutting Apparatus) and Transferring Section)

The slitting sections 7 each include a holder and a blade (which are not illustrated), and the holder is fixed to, for example, a housing of the slitting apparatus 6. The holder holds the blade such that relative positions of the blade and the separator original sheet 12O which is being transferred are fixed. The blade has a pointed edge, which slits the separator original sheet 12O. The slitting sections 7 may be of a shear-cut type which includes upper and lower blades.

As illustrated in FIG. 4, among the long separator sheets 12*a* and the long separator sheets 12*b*, some long separator sheets (i.e., the long separator sheets 12*a*) are transferred to respective cylindrical cores u (bobbins) attached on the first wind-up roller 70U via the roller 66, the roller 68U, the roller 69U, and the first take-up assisting roller 83U, and are wound around the respective cores u.

In this process, the long separator sheets 12*a* are each transferred while tension is being applied thereto in their lengthwise direction (MD).

The rest (i.e., the long separator sheets 12*b*) of the long separator sheets 12*a* and the long separator sheets 12*b* are transferred to respective cylindrical cores 1 (bobbins) attached on the second wind-up roller 70L via the roller 66, the roller 68L, the roller 69L, and the second take-up assisting roller 83L, and are wound around the respective cores 1 (bobbins).

Also in this process, the long separator sheets 12*b* are each transferred while tension is being applied thereto in their lengthwise direction (MD).

The long separator sheets 12*a* thus wound in the form of rolls are referred to as separator rolls 12U, whereas the long separator sheets 12*b* thus wound in the form of rolls are referred to as separator rolls 12L.

It should be noted that the transferring section for the long separator sheets 12*a* includes the roller 66, the roller 68U, the roller 69U, and the first take-up assisting roller 83U, whereas the transferring section for the long separator sheets 12*b* includes the roller 66, the roller 68L, the roller 69L, and the first take-up assisting roller 83L.

Embodiment 1 dealt with an example case in which, as illustrated in FIGS. 4 and 5: the separator original sheet 12O is slit (slitting step is carried out) along the lengthwise direction of the separator original sheet into long separator sheets 12*a* (which are odd-numbered long separator sheets) and long separator sheets 12*b* (which are even-numbered long separator sheets) (i.e., the width, or the dimension in the TD, of the separator original sheet is cut into segments); and the odd-numbered long separator sheets 12*a* are wound around the respective cylindrical cores u (bobbins) attached on the first wind-up roller 70U whereas the even-numbered long separator sheets 12*b* are wound around the respective cylindrical cores 1 (bobbins) attached on the second wind-up roller 70L. Note, however, that this does not imply any limitation.

It should be understood that the number of long separator sheets 12*a* and 12*b* into which the separator original sheet 12O is to be slit depends on the size of the separator original sheet 12O and the width of each of the long separator sheets 12*a* and 12*b* and therefore can be changed if necessary.

It should be also noted that the number of long separator sheets wound around respective cylindrical cores u (bobbins) attached on the first wind-up roller 70U and the number of long separator sheets wound around respective cylindrical cores 1 (bobbins) attached on the second wind-up roller 70L may be the same or different from each other.

(Winding Section)

The first wind-up roller 70U (winding section) has cores u detachably attached thereon which correspond to the respective odd-numbered long separator sheets 12*a*. Similarly, the second wind-up roller 70L (winding section) has cores 1 detachably attached thereon which correspond to the respective even-numbered long separator sheets 12*b*.

As illustrated in FIG. 4, the long separator sheets 12a, after transferred to the first wind-up roller 70U side via the roller 66, are transferred via the rollers 68U and 69U. The long separator sheets 12a are transferred from the roller 69U via the first take-up assisting roller 83U and the first touch roller 81U, and brought into contact with rolling faces. The long separator sheets 12a are wound around the cores u, and thereby the separator rolls 12U are formed. The first wind-up roller 70U, together with the cores u, rotates in the direction indicated by arrow in FIG. 4, and thereby the long separator sheets 12a are wound around the cores u (this is winding step). The cores u, on which the long separator sheets 12a have been wound, can be detached from the first wind-up roller 70U.

Similarly, as illustrated in FIG. 4, the long separator sheets 12b, after transferred to the second wind-up roller 70L side via the roller 66, are transferred via the rollers 68L and 69L. The long separator sheets 12b are transferred from the roller 69L via the second take-up assisting roller 83L and the second touch roller 81L, and brought into contact with rolling faces. The long separator sheets 12b are wound around the cores 1, and thereby the separator rolls 12L are formed. The second wind-up roller 70L, together with the cores 1, rotates in the direction indicated by arrow in FIG. 4, and thereby the long separator sheets 12b are wound around the cores 1 (this is a winding step). The cores 1, on which the long separator sheets 12b have been wound, can be detached from the second wind-up roller 70L.

(Touch Roller)

The first touch roller 81U and the second touch roller 81L of the slitting apparatus 6, illustrated in FIG. 4, are rotatably provided (fixed) at respective ends of the first and second arms 82U and 82L. The first and second arms 82U and 82L are pivottable about respective pivot shafts 84U and 84L at the other ends (i.e., the first and second arms 82U and 82L are pivottable in the directions indicated by arrows in FIG. 4). The first take-up assisting roller 83U is positioned between the first touch roller 81U and the pivot shaft 84U of the first arm 82U, and is rotatably fixed to the first arm 82U. The second take-up assisting roller 83L is positioned between the second touch roller 81L and the pivot shaft 84L of the second arm 82L, and is rotatably fixed to the second arm 82L.

The first touch roller 81U serves to press the long separator sheets 12a, which are to be wound, against the rolling faces (surfaces) of the separator rolls 12U, and the second touch roller 81L serves to press the long separator sheets 12b, which are to be wound, against the rolling faces (surfaces) of the separator rollers 12L. In doing so, the first and second touch rollers 81U and 81L apply pressure to the long separator sheets 12a and 12b with their own weights. The pressure applied by the first and second touch rollers 81U and 81L prevents or reduces wrinkles and the like in the long separator sheets 12a and 12b being wound. The positions of the first and second touch rollers 81U and 81L change according to changes in outer diameters of the separator rolls 12U and 12L so that the first and second touch rollers 81U and 81L make suitable contact with the rolling faces.

(Measuring Apparatus for Measuring Width of Long Separator Sheet)

The slitting apparatus 6 illustrated in FIG. 4 includes the optical width measuring apparatuses 10a and 10b utilizing laser light, which serve as measuring apparatuses for measuring the width of a long separator sheet 12a (this width is a dimension of the long separator sheet 12a in the transverse direction (TD)) and the width of a long separator sheet 12b (this width is a dimension of the long separator sheet 12b in the transverse direction (TD)). One optical width measuring apparatus (the optical width measuring apparatus 10a) is provided between the roller 69U and the first take-up assisting roller 83U, whereas another optical width measuring apparatus (the optical width measuring apparatus 10b) is provided between the roller 69L and the second take-up assisting roller 83L. That is, Embodiment 1 deals with an example case in which each of the optical width measuring apparatuses 10a and 10b is positioned immediately upstream of the winding section in the direction in which the long separator sheet 12a or the long separator sheet 12b is transferred. Note, however, that this does not imply any limitation, as will be described later.

As illustrated in FIG. 5, the optical width measuring apparatus 10a of the slitting apparatus 6 is positioned such that a long separator sheet 12a obtained from a substantially central portion in the transverse direction (TD) of the separator original sheet 12O passes through the optical width measuring apparatus 10a, whereas the optical width measuring apparatus 10b of the slitting apparatus 6 is positioned such that a long separator sheet 12b obtained from the substantially central portion in the transverse direction (TD) of the separator original sheet 12O passes through the optical width measuring apparatus 10b.

In Embodiment 1 in which the slitting apparatus 6 includes only two optical width measuring apparatuses 10a and 10b, each of the optical width measuring apparatuses 10a and 10b is positioned such that a long separator sheet 12a or 12b obtained from a substantially central portion in the transverse direction (TD)), which is expected to curl to the largest extent in the separator original sheet 12O, of the separator original sheet 12O passes through the optical width measuring apparatus 10a or 10b. Note, however, that the positions of the optical width measuring apparatuses 10a and 10b are not limited as such, as will be described later.

Embodiment 1 deals with an example case in which the optical width measuring apparatuses 10a and 10b utilizing laser light are used as measuring apparatuses for measuring widths of the long separator sheets 12a and 12b. Note, however, that the measuring apparatuses for measuring widths the long separator sheets 12a and 12b are not limited to optical width measuring apparatuses, provided that the long separator sheets 12a and 12b are not damaged and that the widths of the long separator sheets 12a and 12b (dimension of a long separator sheet 12a (12b) in the transverse direction (TD) of the long separator sheet 12a (12b)) can be measured. The measuring apparatuses may be, for example, ultrasonic width measuring apparatuses, calipers, or the like.

(Measurement of Curl Amount Using Measuring Apparatus for Measuring Width of Long Separator Sheet)

Figure 6:
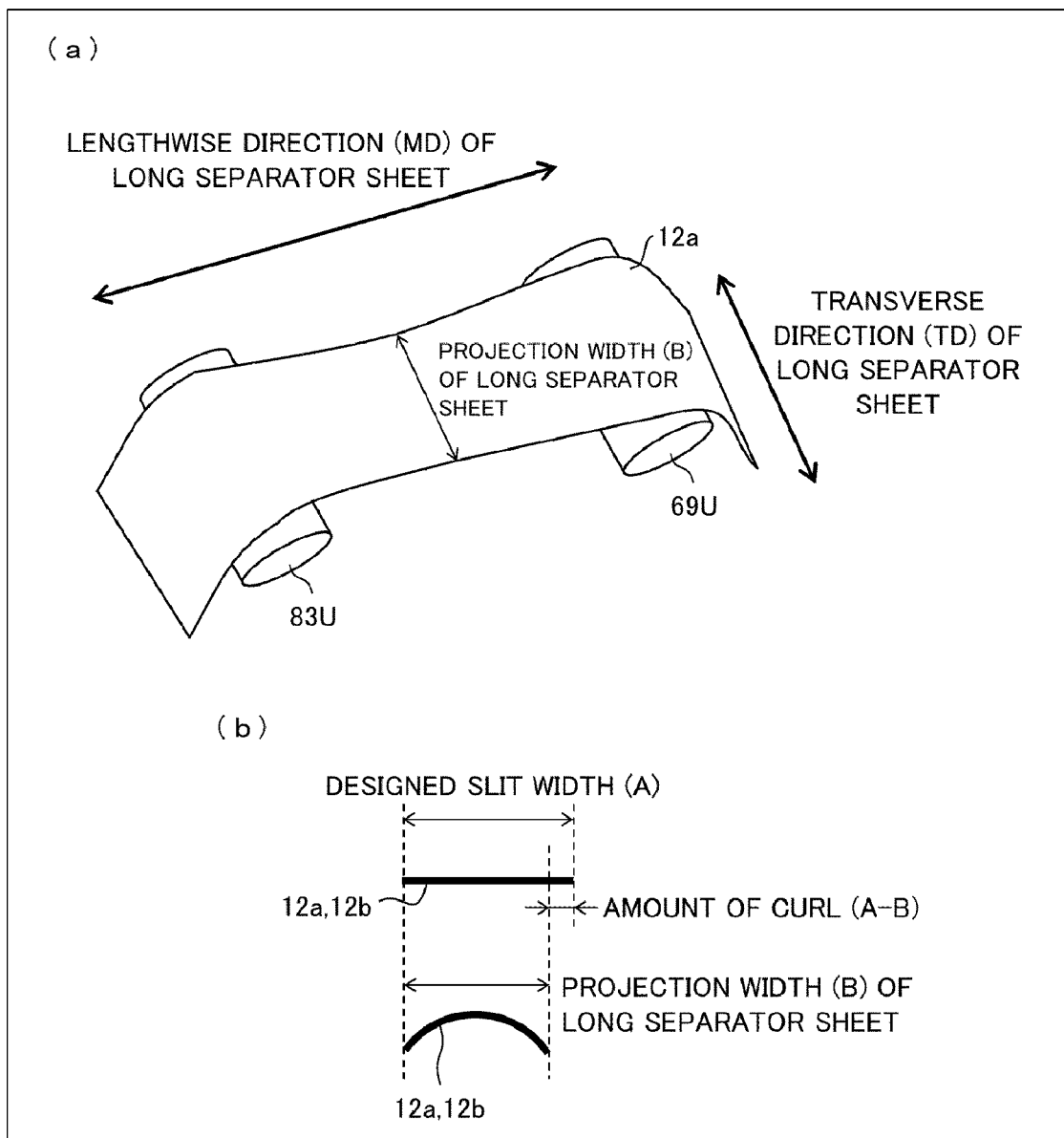
FIG. 6 illustrates what is meant by the amount of curl in a long separator sheet.

FIG. 6 illustrates what is meant by the amount of curl in a long separator sheet 12a or 12b.

(a) of FIG. 6 illustrates how a long separator sheet 12a is transferred between the roller 69U and the first take-up assisting roller 83U, between which the optical width measuring apparatus 10a in the slitting apparatus 6 is provided.

The optical width measuring apparatus 10a (not illustrated), which utilizes laser light, is used to measure a width of the long separator sheet 12a in the transverse direction (TD) of the long separator sheet 12a while the long separator sheet 12a is being transferred between the roller 69U and the first take-up assisting roller 83U. Specifically, the optical width measuring apparatus 10a is used to obtain a projection width (B) of the long separator sheet 12a.

As described earlier, the long separator sheet 12a is transferred between the roller 69U and the first take-up assisting roller 83U while tension is being applied to the long separator sheet 12a in the lengthwise direction (MD) of the long separator sheet 12a. This tension is applied by the first wind-up roller 70U (see FIG. 4) and an unwind roller (not illustrated) on which the separator original sheet 12O wound around a cylindrical core (see FIG. 5) is attached.

(b) of FIG. 6 illustrates how the amount of curl in a long separator sheet 12a or 12b is calculated.

The amount of curl in a long separator sheet 12a or 12b can be calculated using Equation (1) below.

Amount of curl (A−B)=designed slit width (A)−projection width (B) of long separator sheet    Equation (1)

As illustrated in (b) of FIG. 6, the designed slit width (A) is a distance between adjacent blades of the slitting sections 7, and is a designed value. On the other hand, the projection width (B) of a long separator sheet is obtained by actually measuring the width of a long separator sheet 12a or 12b in the transverse direction (TD) with the use of the optical width measuring apparatus 10a or 10b while the long separator sheet 12a or 12b is being transferred. The value of the projection width (B) is smaller than that of the designed slit width (A) because of upward or downward curling of each edge parallel to the lengthwise direction (MD) of the long separator sheet 12a or 12b from a flat plane.

In view of this, the difference between the designed slit width (A) and the projection width (B) of a long separator sheet is defined as the amount of curl (A−B). That is, as the amount of upward or downward curling of each edge parallel to the lengthwise direction (MD) of a long separator sheet from a flat plane becomes large, the projection width (B) becomes small, and therefore the difference between the designed slit width (A) and the projection width (B) of the long separator sheet becomes large, which means that the amount of curl (A−B) increases. On the other hand, as the amount of upward or downward curling of each edge parallel to the lengthwise direction (MD) of a long separator sheet from a flat plane becomes small, the projection width (B) of the long separator sheet becomes large, and therefore the difference between the designed slit width (A) and the projection width (B) of the long separator sheet becomes small, which means that the amount of curl (A−B) decreases.

It should be noted that the designed slit width (A) is a value that determines the slit widths of long separator sheets 12a and 12b. When the designed slit width (A) is changed, the slit widths of the long separator sheets 12a and 12b change accordingly.

Embodiment 1 dealt with an example case in which the amount of curl (A−B) is obtained, using the designed slit width (A), from the difference between the designed slit width (A) and the projection width (B) of a long separator sheet. Note, however, that this does not imply any limitation. Instead of the designed slit width (A), a width of a long separator sheet 12a or 12b in the transverse direction (TD), measured while curl and wrinkles are stretched out, may be used.

The above width of the long separator sheet 12a or 12b in the transverse direction (TD) (i.e., the width measured while curl and wrinkles are stretched out) may be measured with the use of, for example, an optical width measuring apparatus, an ultrasonic width measuring apparatus, a caliper, or the like.

Figures 7, 8:
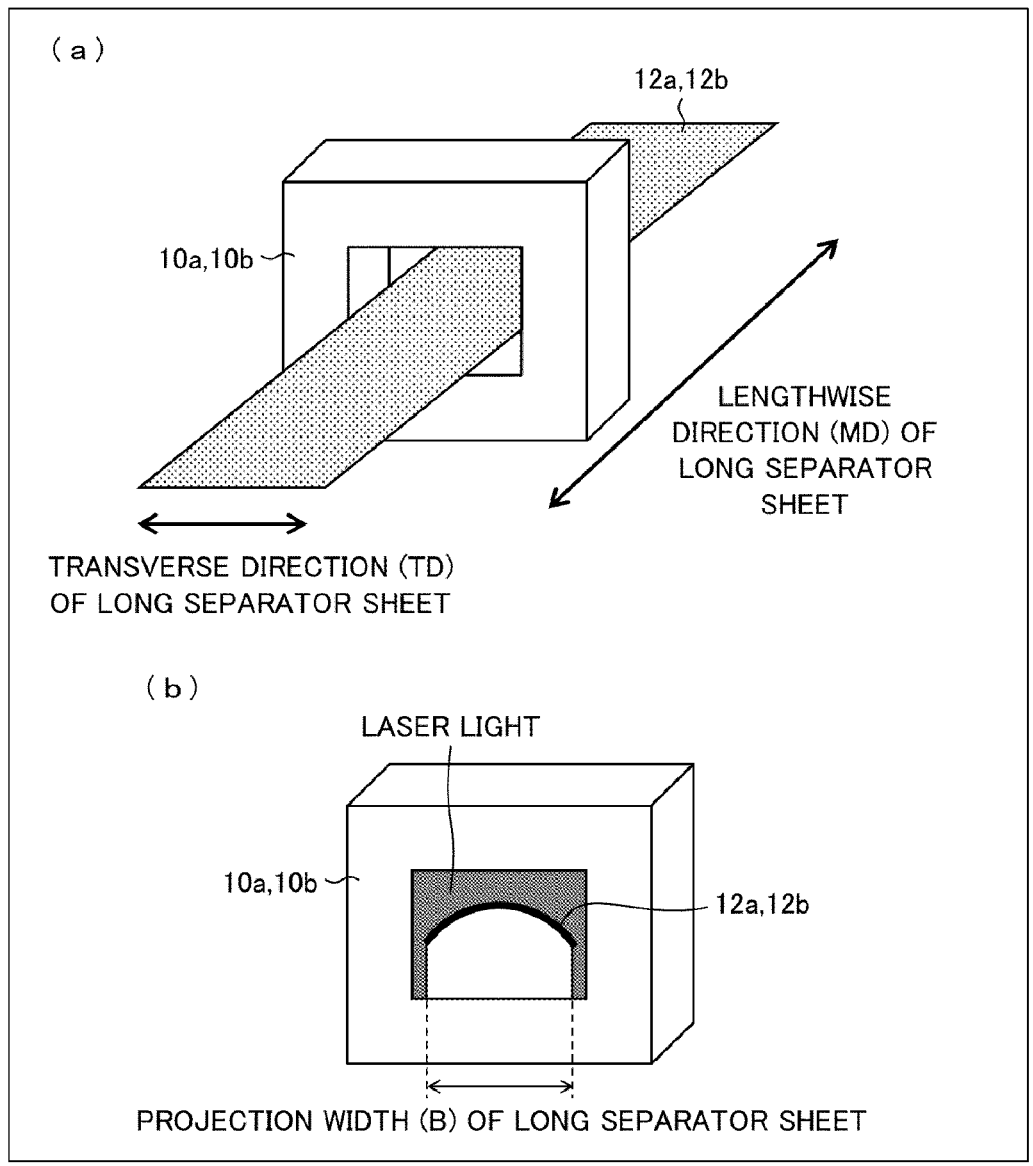
FIG. 7 illustrates how the amount of curl in a long separator sheet is measured with the use of an optical width measuring apparatus.
FIG. 8 is a table showing a correspondence relationship between amounts of curl measured by the slitting apparatus including the optical width measuring apparatuses illustrated in FIG. 4 and amounts of curl measured by a conventional method.

FIG. 7 illustrates how the amount of curl in a long separator sheet 12a or 12b is measured with the use of the optical width measuring apparatus 10a or 10b utilizing laser light.

As illustrated in (a) of FIG. 7, each of the optical width measuring apparatuses 10a and 10b has a hole that allows passage of the long separator sheet 12a or 12b without hindering the transfer of the long separator sheet 12a or 12b.

As illustrated in (b) of FIG. 7, when the long separator sheet 12a or 12b passes through the hole in the optical width measuring apparatus 10a or 10b, laser light is emitted from a laser light emitting section at an upper portion of the optical width measuring apparatus 10a or 10b and received by a laser light receiving section at a lower portion of the optical width measuring apparatus 10a or 10b via the long separator sheet 12a or 12b, and thereby the projection width (B) of the long separator sheet can be obtained. Specifically, the laser light receiving section receives no or little laser light at a region above which the long separator sheet 12a or 12b is present, whereas receives intense laser light as-is at a region above which no long separator sheet 12a or 12b is present. Therefore, by measuring the width of the region which has received no or little laser light, it is possible to obtain the projection width (B) of the long separator sheet. It should be noted that the laser light emitting section may be provided at a lower portion of the optical width measuring apparatus 10a or 10b, and the laser light receiving section may be provided at an upper portion of the optical width measuring apparatus 10a or 10b.

In Embodiment 1, the laser light emitted from the laser light emitting section is linear in the transverse direction (TD) of the long separator sheet 12a or 12b for continuous measurement throughout the entire length of the long separator sheet 12a or 12b. Note, however, that this does not imply any limitation. In a case where, for example, the measurement is carried out at predetermined intervals, the laser light may have a certain width in the lengthwise direction (MD) of the long separator sheet 12a or 12b.

Embodiment 1 dealt with an example case in which one optical width measuring apparatus (10a or 10b) includes both the laser light emitting section and the laser light receiving section and has a hole that allows passage of a long separator sheet 12a or 12b without hindering the transfer of the long separator sheet 12a or 12b. Note, however, that the following optical width measuring apparatus may alternatively be employed: an optical width measuring apparatus which is constituted by a laser light emitting section and a light receiving section provided separately from each other and in which one of these sections is provided above a long separator sheet 12a or 12b and the other is provided below the long separator sheet 12a or 12b.

Embodiment 1 dealt with, as an example, the optical width measuring apparatuses 10a and 10b each of which has a hole such that the laser light emitting section and the laser light receiving section are arranged to measure the overall width of a long separator sheet 12a or 12b. Note, however, that it is not always necessary to measure the overall width including the central portion in the transverse direction of the long separator sheet 12a or 12b, especially in a case where the long separator sheet 12a or 12b has a large width. Alternatively, the projection width (B) of the long separator sheet may be obtained by using (i) a pair of laser light emitting section and laser light receiving section to determine the position of one of the opposite edges in the transverse direction of the long separator sheet 12a or 12b and (ii) another pair of laser light emitting section and laser light receiving section to determine the position of the other of the opposite edges in the transverse direction of the long separator sheet, which are provided at a specified distance between them.

FIG. 8 is a table showing a correspondence relationship between amounts of curl measured by the slitting apparatus 6 including the optical width measuring apparatuses 10a and 10b and amounts of curl measured by a conventional method.

The values of the amounts of curl obtained by in-line measurement shown in FIG. 8 are values of amounts of curl (A−B) calculated based on the projection widths (B) of a long separator sheet actually measured at multiple positions by the foregoing optical width measuring apparatus 10a or 10b while the separator 12a or 12b is being transferred. Each measurement was carried out at 23° C. and 50% RH.

On the other hand, the values of the amounts of curl obtained by conventional measurement shown in FIG. 8 are values obtained in the following manner: a piece centered on a position at which the foregoing in-line measurement of amount of curl was carried out and having a size of 300 mm in the lengthwise direction (MD) of a long separator sheet 12a or 12b and 200 mm in the transverse direction (TD) of the long separator sheet 12a or 12b was cut from the long separator sheet 12a or 12b as a sample; and the maximum distance from a flat surface on which the sample is placed to a lifted edge parallel to the MD of the sample was measured with the use of a graduated ruler.

As is clear from FIG. 8, by the in-line measurement of amount of curl using the foregoing optical width measuring apparatus 10a or 10b, the amount of curl is measurable even in a case where the amount of curl is relatively large and would be regarded as unmeasurable by conventional methods.

As has been described, the slitting apparatus 6 includes: the slitting sections (cutting apparatuses) 7 configured to slit the separator original sheet 12O along the lengthwise direction of the separator original sheet 12O into long separator sheets 12a and long separator sheets 12b; and the winding sections (first wind-up roller 70U and second wind-up roller 70L) each configured to wind the long separator sheets 12a (12b) around the cores u (1), the slitting apparatus including: the transferring sections (transferring section including the roller 66, the roller 68U, the roller 69U, and the first take-up assisting roller 83U, and transferring section including the roller 66, the roller 68L, the roller 69L, and the second take-up assisting roller 83L) each configured to transfer the long separator sheets 12a (12b) from the slitting sections (cutting apparatuses) 7 to the winding section (first wind-up roller 70U or second wind-up roller 70L) while tension is being applied to the long separator sheets 12a (12b) in the lengthwise direction (MD) of the long separator sheets 12a (12b); and the measuring apparatuses (optical width measuring apparatuses 10a and 10b) each configured to measure, in the transferring section, the width of at least one of the long separator sheets 12a (12b), the width being a distance between the opposite edges, each of which extends parallel to the lengthwise direction (MD) of the at least one of the long separator sheets 12a (12b), of the at least one of the long separator sheets 12a (12b).

According to the above configuration, the slitting apparatus 6 includes: the transferring sections (transferring section including the roller 66, the roller 68U, the roller 69U, and the first take-up assisting roller 83U, and transferring section including the roller 66, the roller 68L, the roller 69L, and the second take-up assisting roller 83L) each configured to transfer the long separator sheets 12a (12b) from the slitting sections (cutting apparatuses) 7 to the winding section (first wind-up roller 70U or second wind-up roller 70L) while tension is being applied to the long separator sheets 12a (12b) in the lengthwise direction (MD) of the long separator sheets 12a (12b); and the measuring apparatuses (optical width measuring apparatuses 10a and 10b) each configured to measure, in the transferring section, the width of at least one of the long separator sheets 12a (12b), the width being a distance between the opposite edges, each of which extends parallel to the lengthwise direction (MD) of the at least one of the long separator sheets 12a (12b), of the at least one of the long separator sheets 12a (12b).

As such, the above configuration makes it possible to measure the amount of curl at an edge parallel to the lengthwise direction (MD) of at least one of the long separator sheets 12a (12b) while tension is being applied to the long separator sheets 12a (12b) in the lengthwise direction (MD) of the long separator sheets 12a (12b). This makes it possible to carry out highly accurate nondestructive measurement of the amount of curl, without having to cut a sample from the long separator sheets 12a (12b).

This also makes it possible to measure the amount of curl throughout the entire length of one long separator sheet.

The above descriptions dealt with, as an example, a slitting apparatus 6 including only two optical width measuring apparatuses 10a and 10b each of which is positioned such that a long separator sheet 12a or 12b obtained from a substantially central portion in the transverse direction (TD) of the separator original sheet 12O (i.e., the portion expected to curl to the largest extent in the separator original sheet 12O) passes through the optical width measuring apparatus 10a or 10b. Note, however, that the number and positions of the optical width measuring apparatuses 10a and 10b are not limited as such, as will be described below.

Figure 9:
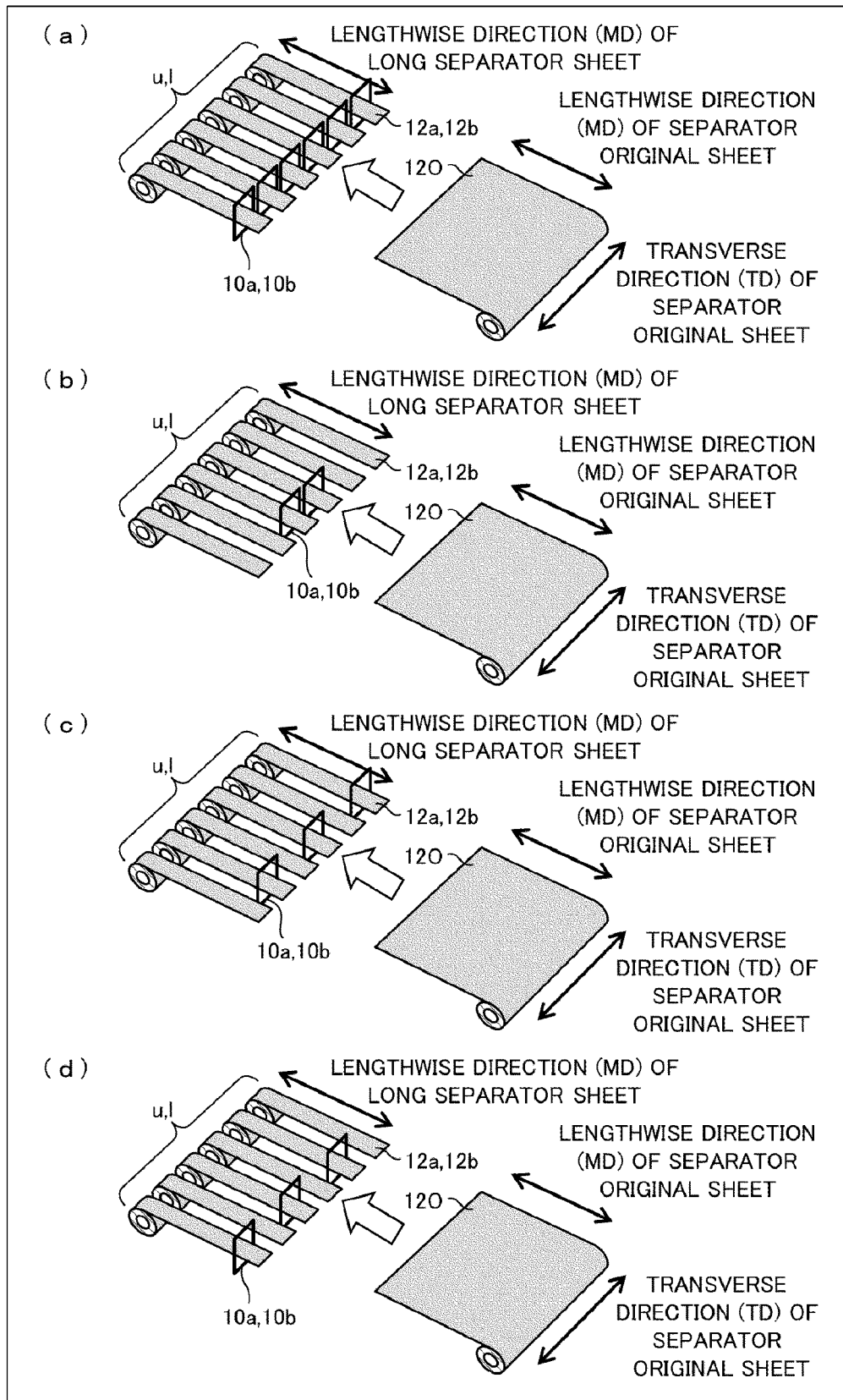
FIG. 9 illustrates variations of a slitting apparatus including optical width measuring apparatuses, which are different in position and/or number of the optical width measuring apparatuses.

FIG. 9 illustrates variations of the slitting apparatus 6 which are different in position and/or number of the optical width measuring apparatuses 10a and 10b from the foregoing slitting apparatus 6.

(a) of FIG. 9 illustrates a case in which optical width measuring apparatuses 10a (10b) are provided to measure widths of all long separator sheets 12a (12b) which are being transferred while tension is being applied thereto in their lengthwise direction (MD). Each of the widths is a distance between the opposite edges, each extending parallel to the lengthwise direction (MD) of the long separator sheet 12a (12b), of the long separator sheet 12a (12b). (b) of FIG. 9 illustrates a case in which four optical width measuring apparatuses (two optical width measuring apparatuses 10a and two optical width measuring apparatuses 10b) are provided and in which the optical width measuring apparatuses 10a (10b) are positioned such that long separator sheets 12a (12b) obtained from a substantially central portion in the transverse direction (TD) of the separator original sheet 12O (i.e., the portion expected to curl to the largest extent) pass through the optical width measuring apparatuses 10a (10b). (c) and (d) of FIG. 9 each illustrate a case in which optical width measuring apparatuses 10a (10b) are provided to measure widths of half of all the transferred long separator sheets 12a (12b). Each of the widths is a distance between the opposite edges, each extending parallel to the lengthwise direction (MD) of the long separator sheet 12a (12b), of the long separator sheet 12a (12b).

The arrangement illustrated in (a) of FIG. 9 makes it possible to measure the amount of curl throughout the entire length of each long separator sheet 12a (12b) and possible to measure the amount of curl in a portion of each long separator sheet 12a (12b).

The above descriptions dealt with an example case in which each of the optical width measuring apparatuses 10a and 10b is positioned immediately upstream of the winding section in the direction in which a long separator sheet 12a or 12b is transferred. Note, however, that the positions of the optical width measuring apparatus 10a and 10b are not limited as such, as described below.

Figure 10:
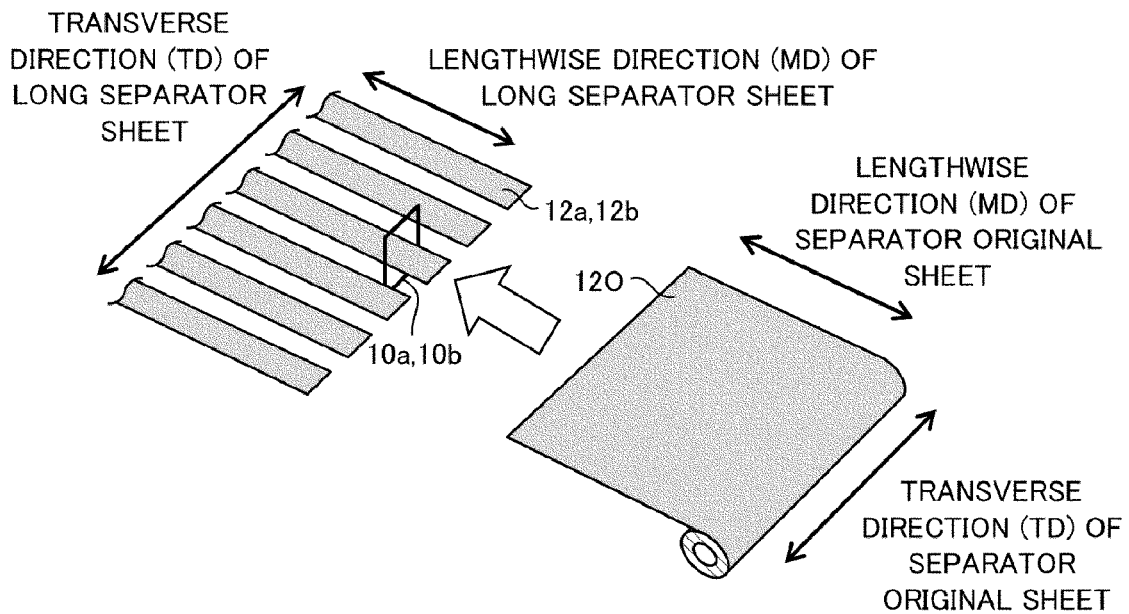
FIG. 10 illustrates another variation of the slitting apparatus including optical width measurement apparatuses, which is different in terms of the position of an optical width measuring apparatus.

FIG. 10 illustrates another variation of the slitting apparatus 6 which is different from the foregoing slitting apparatus 6 in terms of the positions of the optical width measuring apparatuses 10a and 10b.

As illustrated in FIG. 10, the position of the optical width measuring apparatus 10a in the slitting apparatus 6 may be, for example, between the roller 66 and the roller 68U or between the roller 68U and the roller 69U, instead of between the roller 69U and the first take-up assisting roller 83U as illustrated in FIG. 4. The position of the optical width measuring apparatus 10b in the slitting apparatus 6 may be, for example, between the roller 66 and the roller 68L or between the roller 68L and the roller 69L, instead of between the roller 69L and the second take-up assisting roller 83L as illustrated in FIG. 4.

Embodiment 1 is configured such that the amount of curl is measured continuously and that the measured value of the amount of curl is recorded. Such Embodiment 1 may be configured such that, if the value of the amount of curl exceeded a prescribed value, an alerting mechanism (not illustrated) gives an alert notifying that the amount of curl has exceeded the prescribed value.

Embodiment 2

The following description will discuss Embodiment 2 of the present invention with reference to FIG. 11. A curl amount measuring apparatus 110 of Embodiment 2 is different from Embodiment 1 in that a width of a long separator sheet 101, which has been unwound from a separator roll 100, is measured while tension is being applied to the long separator sheet 101 in the lengthwise direction of the long separator sheet 101. The width is a distance between the opposite edges, each extending parallel to the lengthwise direction of the long separator sheet 101, of the long separator sheet 101.

(a) of FIG. 11 schematically illustrates a configuration of the curl amount measuring apparatus 110, and (b) of FIG. 11 illustrates how the amount of curl at each edge parallel to the MD is measured by using the curl amount measuring apparatus 110.

As illustrated in (a) of FIG. 11, the curl amount measuring apparatus 110 is to measure a width of a long separator sheet 101, which has been unwound from a separator roll 100, while applying tension to the long separator sheet 101 in the lengthwise direction of the long separator sheet 101. The width is a distance between the opposite edges, each extending parallel to the lengthwise direction of the long separator sheet 101, of the long separator sheet 101.

The separator roll 100 is obtained by winding the long separator sheet 101, which resulted from slitting of a separator original sheet along the lengthwise direction of the separator original sheet, around a core 102.

The curl amount measuring apparatus 110 includes: a first roller 103 for attaching the separator roll 100 thereon; a stopper 104, second rollers 105 and 106, and a weight 107 (which is a tension applying part) which are arranged to apply tension, in the lengthwise direction of the long separator sheet 101, to the long separator sheet 101 unwound from the separator roll 100, the stopper 104 being configured to stop the rotation of the separator roll 100 on the first roller 103; and a measuring apparatus 108 to measure the width of the long separator sheet 101 while tension is being applied, in the lengthwise direction of the long separator sheet 101, to the long separator sheet 101 unwound from the separator roll 100, the width being a distance between the opposite edges, each extending parallel to the lengthwise direction of the long separator sheet 101, of the long separator sheet 101.

For measuring the width (i.e., the distance between the opposite edges, each extending parallel to the lengthwise direction of the long separator sheet 101, of the long separator sheet 101) of the long separator sheet 101, which has been unwound from the separator roll 100, while tension is being applied to the long separator sheet 101 in the lengthwise direction of the long separator sheet 101, that is, for measuring the amount of curl at edges each of which is parallel to the MD, a certain length of the long separator sheet 101 is unwound from the separator roll 100 in which the long separator sheet 101 is rolled, and the separator roll 100 is fixed with the stopper 104 so that the separator roll 100 does not rotate. Then, the unwound long separator sheet 101 is maintained with a certain tension applied thereto with the use of the weight 107 via the second rollers 105 and 106.

Then, a width C in the transverse direction of the long separator sheet 101 is measured while curl and wrinkles are stretched out, whereas a measured value D is obtained by measuring the narrowest width (which is situated between the second roller 105 and the second roller 106) in the TD of the unwound long separator sheet 101 in the situation shown in (b) of FIG. 11 (with a certain tension applied to the unwound long separator sheet 101 with the use of the weight 107 via the second rollers 105 and 106). The difference between the width C and the measured value D is defined as the amount of curl (C-D).

That is, the amount of curl is obtained from the difference between (i) a second width in the TD, which is orthogonal to the MD, of the long separator sheet 101 measured while curl at edges each extending parallel to the MD of the long separator sheet 101 is stretched out and (ii) a first width in the TD, which is orthogonal to the MD, of the long separator sheet 101 measured while applying tension to the long separator sheet 101 in the MD of the long separator sheet 101.

In Embodiment 2, an optical width measuring apparatus is used as a measuring apparatus 108 to measure the width (i.e., distance between the opposite edges each extending parallel to the lengthwise direction) of the long separator sheet 101. Note, however, that the measuring apparatus 108 is not limited to an optical width measuring apparatus.

Embodiment 2 dealt with an example case in which the curl amount measuring apparatus 110 includes two second rollers 105 and 106. Note, however, that this does not imply any limitation. It is only necessary that one or more second rollers be provided.

Embodiment 2 dealt with an example case in which, in the curl amount measuring apparatus 110, the weight 107 (tension applying part) is directly attached to the long separator sheet 101 which has been unwound from the separator roll 100 in order to apply tension, in the lengthwise direction of the long separator sheet 101, to the long separator sheet 101 unwound from the separator roll 100. Note, however, that this does not imply any limitation. Needless to say, some other roller or the like on which the long separator sheet 101 is wound around may be used as the tension applying part in order to apply tension, in the lengthwise direction of the long separator sheet 101, to the long separator sheet 101 unwound from the separator roll 100.

Embodiment 2 dealt with an example case in which the narrowest width in the TD of the long separator sheet 101 is measured. Note, however, that the measurement may be carried out on widths at multiple positions or may be carried out throughout the entire length of the long separator sheet 101.

It should be noted that a destructive measurement of the amount of curl is a measurement method that necessitates cutting a sample having a certain size from a long separator sheet, whereas a nondestructive measurement of the amount of curl is a measurement method that does not necessitate cutting a sample from a long separator sheet.

The above arrangement makes it possible to measure the width (i.e., distance between the opposite edges, each extending parallel to the lengthwise direction of the long separator sheet 101, of the long separator sheet 101) of the long separator sheet 101 while tension is being applied to the long separator sheet 101 in the lengthwise direction of the long separator sheet 101. This makes it possible to carry out highly accurate nondestructive measurement of the amount of curl, without having to cut a sample from the long separator sheet 101.

The curl amount measuring apparatus 110 may also include a wrinkle removing mechanism (not illustrated) to remove wrinkles from the long separator sheet 101 and/or a defect detecting mechanism (not illustrated) to detect defects in the long separator sheet 101.

Embodiment 3

The following description will discuss Embodiment 3 of the present invention with reference to FIG. 12. A curl amount measuring apparatus 120 of Embodiment 3 is different from Embodiment 2 in that a third roller 116 around which a long separator sheet 101 is wound is used as a tension applying part to apply tension, in the lengthwise direction of the long separator sheet 101, to the long separator sheet 101 unwound from the separator roll 100.

FIG. 12 schematically illustrates a configuration of the curl amount measuring apparatus 120.

As illustrated in FIG. 12, the curl amount measuring apparatus 120 is to measure a width (i.e., distance between the opposite edges, each extending parallel to the lengthwise direction of the long separator sheet 101, of the long separator sheet 101) of the long separator sheet 101 while applying tension, in the lengthwise direction of the long separator sheet 101, to the long separator sheet 101 unwound from a separator roll 100.

The curl amount measuring apparatus 120 includes: a first roller 113 for attaching the separator roll 100 thereon; second rollers 114 and 115 and the third roller 116 (which is a tension applying part) around which the long separator sheet 101 is wound, each of which serves to apply tension, in the lengthwise direction of the long separator sheet 101, to the long separator sheet 101 unwound from the separator roll 100; and a measuring apparatus 108 to measure a width (i.e., distance between the opposite edges, each extending parallel to the lengthwise direction of the long separator sheet 101, of the long separator sheet 101) of the long separator sheet 101 while tension is being applied, in the lengthwise direction of the long separator sheet 101, to the long separator sheet 101 unwound from the separator roll 100.

In the curl amount measuring apparatus 120, the long separator sheet 101 is unwound from the separator roll 100 while tension is being applied to the long separator sheet 101 in the lengthwise direction of the long separator sheet 101, is subjected to a measurement by the measuring apparatus 108, and then is wound around the core of the third roller 116 to form a separator roll 117.

The curl amount measuring apparatus 120 may also include a wrinkle removing mechanism (not illustrated) to remove wrinkles from the long separator sheet 101 and/or a defect detecting mechanism (not illustrated) to detect defects in the long separator sheet 101.

Embodiment 3 is configured such that the amount of curl is measured continuously and that the measured value of the amount of curl is recorded. Such Embodiment 3 may be configured such that, if the value of the amount of curl exceeded a prescribed value, an alerting mechanism (not illustrated) gives an alert notifying that the amount of curl has exceeded the prescribed value.

In Embodiment 3, an optical width measuring apparatus is used as a measuring apparatus 108 to measure the width (i.e., distance between the opposite edges, each extending parallel to the lengthwise direction) of the long separator sheet 101. Note, however, that the measuring apparatus 108 is not limited to an optical width measuring apparatus.

Embodiment 3 dealt with an example case in which the curl amount measuring apparatus 120 includes two second rollers 114 and 115. Note, however, that this does not imply any limitation. The number of second rollers may be one or more depending on need. Second rollers may be omitted if not needed.

The curl amount measuring apparatus 120 makes it possible to measure a width (i.e., distance between the opposite edges, each extending parallel to the lengthwise direction of the long separator sheet 101, of the long separator sheet 101) of the long separator sheet 101 while tension is being applied to the long separator sheet 101 in the lengthwise direction of the long separator sheet 101. This makes it possible to carry out highly accurate nondestructive measurement of the amount of curl even in a case where the amount of curl is relatively large, without having to cut a sample from the long separator sheet 101.

Furthermore, the long separator sheet 101 unwound from the separator roll 100, after the measurement of the width (i.e., distance between the opposite edges, each extending parallel to the lengthwise direction of the long separator sheet 101, of the long separator sheet 101), is wound around the third roller 116.

[Recap]

A method of measuring an amount of curl in a separator in accordance with Aspect 1 of the present invention includes: a step of, in regard to at least one of long separator sheets which resulted from slitting of a separator original sheet along a lengthwise direction of the separator original sheet, measuring an amount of curl at an edge of the at least one of the long separator sheets while applying tension to the at least one of the long separator sheets in a lengthwise direction of the at least one of the long separator sheets, the edge being parallel to the lengthwise direction of the at least one of the long separator sheets.

According to the above method, in regard to at least one of the long separator sheets, the amount of curl at an edge (edge parallel to the lengthwise direction) of the at least one of the long separator sheets is measured while tension is being applied to the at least one of the long separator sheets in a lengthwise direction of the at least one of the long separator sheets. This makes it possible to carry out a highly accurate nondestructive measurement of the amount of curl even in a case where the amount of curl is relatively large, without having to cut a sample from the long separator sheet.

Thus, this method makes it possible to measure the amount of curl in all the long separator sheets or to measure the amount of curl throughout the entire length of one long separator sheet.

A method of measuring an amount of curl in separator in accordance with Aspect 2 of the present invention may be arranged such that, based on Aspect 1, the method includes: a slitting step including slitting the separator original sheet along the lengthwise direction of the separator original sheet into the long separator sheets; and a winding step including winding the long separator sheets around respective cores, the step of measuring including measuring, while the long separator sheets are being transferred from the slitting step to the winding step, the amount of curl at the edge of the at least one of the long separator sheets while applying tension to the at least one of the long separator sheets in the lengthwise direction of the at least one of the long separator sheets.

According to the above method, in regard to at least one of the long separator sheets, the amount of curl at an edge (edge parallel to the lengthwise direction) of the at least one of the long separator sheets is measured while the long separator sheets are being transferred from the slitting step to the winding step. This makes it possible to carry out a highly accurate nondestructive measurement of the amount of curl even in a case where the amount of curl is relatively large, without having to cut a sample from the long separator sheet.

A method of measuring an amount of curl in separator in accordance with Aspect 3 of the present invention may be arranged such that, based on Aspect 1: the at least one of the long separator sheets is at least one long separator sheet unwound from at least one of separator rolls in which the long separator sheets are wound around the respective cores; and the step of measuring includes measuring the amount of curl at the edge of the at least one long separator sheet while applying tension to the at least one long separator sheets in the lengthwise direction of the at least one long separator sheet.

According to the above method, it is possible to measure the amount of curl at an edge (edge parallel to the lengthwise direction) of a long separator sheet, which has been unwound from a separator roll, while applying tension to the long separator sheet in the lengthwise direction of the long separator sheet. This makes it possible to carry out a highly accurate nondestructive measurement of the amount of curl even in a case where the amount of curl is relatively large, without having to cut a sample from the long separator sheet.

A method of measuring an amount of curl in separator in accordance with Aspect 4 of the present invention may be arranged such that, based on any of Aspects 1 to 3, the step of measuring includes measuring the amount of curl throughout the edge of the at least one of the long separator sheets.

The above method makes it possible to measure the amount of curl throughout the length of the at least one of the long separator sheets.

A method of measuring an amount of curl in separator in accordance with Aspect 5 of the present invention may be arranged such that, based on any of Aspects 1 to 4, the step of measuring includes measuring the amount of curl with use of an optical width measuring apparatus.

The above method makes it possible to measure the amount of curl in the at least one of the long separator sheets with the use of an optical width measuring apparatus.

A method of measuring an amount of curl in separator in accordance with Aspect 6 of the present invention may be arranged such that, based on any of Aspects 1 to 5, the amount of curl is a difference between (i) a slit width of the at least one of the long separator sheets, the slit width being orthogonal to the lengthwise direction of the at least one of the long separator sheets and being a designed value, and (ii) a first width of the at least one of the long separator sheets, the first width being orthogonal to the lengthwise direction of the at least one of the long separator sheets and having been measured while applying tension to the at least one of the long separator sheets in the lengthwise direction of the at least one of the long separator sheets.

According to the above method, it is possible to obtain the amount of curl in the at least one of the long separator sheets from the difference between the slit width and the first width of the at least one of the long separator sheets, the first width being orthogonal to the lengthwise direction of the at least one of the long separator sheets and having been measured while applying tension to the at least one of the long separator sheets in the lengthwise direction of the at least one of the long separator sheets.

A method of measuring an amount of curl in separator in accordance with Aspect 7 of the present invention may be arranged such that, based on any of Aspects 1 to 5, the amount of curl is a difference between (i) a second width of the at least one of the long separator sheets, the second width being orthogonal to the lengthwise direction of the at least one of the long separator sheets and having been measured while curl at the edge of the at least one long separator sheets is stretched out, and (ii) a first width of the at least one of the long separator sheets, the first width being orthogonal to the lengthwise direction of the at least one of the long separator sheets and having been measured while applying tension to the at least one of the long separator sheets in the lengthwise direction of the at least one of the long separator sheets.

According to the above method, it is possible to obtain the amount of curl in the at least one of the long separator sheets from the difference between (i) the second width of the at least one of the long separator sheets, the second width being orthogonal to the lengthwise direction of the at least one of the long separator sheets and having been measured while curl at the edge of the at least one long separator sheets is stretched out, and (ii) the first width of the at least one of the long separator sheets, the first width being orthogonal to the lengthwise direction of the at least one of the long separator sheets and having been measured while applying tension to the at least one of the long separator sheets in the lengthwise direction of the at least one of the long separator sheets.

A method of measuring an amount of curl in separator in accordance with Aspect 8 of the present invention may be arranged such that, based on any of Aspects 1 to 7, the at least one of the long separator sheets is at least one long separator sheet obtained from a central portion of the separator original sheet, the central portion being positioned at a center in a direction orthogonal to the lengthwise direction of the separator original sheet.

According to the above method, it is possible to obtain the amount of curl in a long separator sheet obtained from the central portion of the separator original sheet, the central portion being positioned at the center in the direction orthogonal to the lengthwise direction of the separator original sheet and being expected to curl to a relatively large extent.

A slitting apparatus in accordance with Aspect 9 of the present invention includes: a slitting section configured to slit a separator original sheet along a lengthwise direction of the separator original sheet into long separator sheets; and a winding section configured to wind the long separator sheets around respective cores, the slitting apparatus including: a transferring section configured to transfer the long separator sheets from the slitting section to the winding section while tension is being applied to the long separator sheets in a lengthwise direction of the long separator sheets; and a measuring apparatus configured to measure, in the transferring section, a width of at least one of the long separator sheets, the width being a distance between opposite edges, each of which extends parallel to the lengthwise direction of the at least one of the long separator sheets, of the at least one of the long separator sheets.

According to the above arrangement, the slitting apparatus includes: a transferring section configured to transfer the long separator sheets from the slitting section to the winding section while tension is being applied to the long separator sheets in a lengthwise direction of the long separator sheets; and a measuring apparatus configured to measure, in the transferring section, a width of at least one of the long separator sheets, the width being a distance between opposite edges, each of which extends parallel to the lengthwise direction of the at least one of the long separator sheets, of the at least one of the long separator sheets.

Thus, according to the above arrangement, in regard to at least one of the long separator sheets, the amount of curl at an edge (edge parallel to the lengthwise direction) of the at least one of the long separator sheets can be measured while applying tension to the at least one of the long separator sheets in the lengthwise direction of the at least one of the long separator sheets. This makes it possible to carry out a highly accurate nondestructive measurement of the amount of curl even in a case where the amount of curl is relatively large, without having to cut a sample from the long separator sheet.

A slitting apparatus in accordance with Aspect 10 of the present invention may be arranged such that, based on Aspect 9, in the transferring section, the measuring apparatus is located at a position through which the at least one of the long separator sheets is transferred, the at least one of the long separator sheets being at least one long separator sheet obtained from a central portion of the separator original sheet, the central portion being positioned at a center in a direction orthogonal to the lengthwise direction of the separator original sheet.

According to the above arrangement, it is possible to obtain the amount of curl in a long separator sheet obtained from the central portion of the separator original sheet, the central portion being positioned at the center in the direction orthogonal to the lengthwise direction of the separator original sheet and being expected to curl to a relatively large extent.

A slitting apparatus in accordance with Aspect 11 of the present invention may be arranged such that, based on Aspect 9 or 10: the measuring apparatus is an optical width measuring apparatus; the width of the at least one of the long separator sheets is a projection width of the at least one of the long separator sheets measured with use of the optical width measuring apparatus, the projection width being orthogonal to the lengthwise direction of the at least one of the long separator sheets; and an amount of curl is a difference between (i) a slit width that is orthogonal to the lengthwise direction of the separator original sheet, the slit width being determined by the slitting section, and (ii) the projection width.

According to the above arrangement, it is possible to obtain the amount of curl in the at least one of the long separator sheets with the use of an optical width measuring apparatus.

A curl amount measuring apparatus in accordance with Aspect 12 of the present invention includes: a first roller for attaching a separator roll thereon, the separator roll being constituted by (i) a core and (ii) a long separator sheet, which resulted from slitting of a separator original sheet along a lengthwise direction of the separator original sheet, wound around the core; a stopper, a second roller, and a tension applying part each of which serves to apply tension, in a lengthwise direction of the long separator sheet, to the long separator sheet unwound from the separator roll, the stopper being configured to stop rotation of the separator roll on the first roller; and a measuring apparatus configured to measure a width of the long separator sheet unwound from the separator roll while tension is being applied to the long separator sheet in the lengthwise direction of the long separator sheet, the width being a distance between opposite edges, each of which extends parallel to the lengthwise direction of the long separator sheet, of the long separator sheet.

According to the above arrangement, the curl amount measuring apparatus includes: a stopper, a second roller, and a tension applying part each of which serves to apply tension, in a lengthwise direction of the long separator sheet, to the long separator sheet unwound from the separator roll, the stopper being configured to stop rotation of the separator roll on the first roller; and a measuring apparatus configured to measure a width of the long separator sheet unwound from the separator roll while tension is being applied to the long separator sheet in the lengthwise direction of the long separator sheet, the width being a distance between opposite edges, each of which extends parallel to the lengthwise direction of the long separator sheet, of the long separator sheet. Therefore, it is possible to measure the width (distance between opposite edges, each of which extends parallel to the lengthwise direction of the long separator sheet, of the long separator sheet) of the long separator sheet while tension is applied to the long separator sheet in the lengthwise direction of the long separator sheet. This makes it possible to carry out a highly accurate nondestructive measurement of the amount of curl even in a case where the amount of curl is relatively large, without having to cut a sample from the long separator sheet.

A curl amount measuring apparatus in accordance with Aspect 13 of the present invention includes: a first roller for attaching a separator roll thereon, the separator roll being constituted by (i) a core and (ii) a long separator sheet, which resulted from slitting of a separator original sheet along a lengthwise direction of the separator original sheet, wound around the core; a third roller configured to wind therearound the long separator sheet unwound from the separator roll while applying tension to the long separator sheet in a lengthwise direction of the long separator sheet; and a measuring apparatus configured to measure a width of the long separator sheet unwound from the separator roll while tension is being applied to the long separator sheet in the lengthwise direction of the long separator sheet, the width being a distance between opposite edges, each of which extends parallel to the lengthwise direction of the long separator sheet, of the long separator sheet.

According to the above arrangement, it is possible to measure the width (distance between opposite edges, each of which extends parallel to the lengthwise direction of the long separator sheet, of the long separator sheet) of the long separator sheet while tension is being applied to the long separator sheet in the lengthwise direction of the long separator sheet. This makes it possible to carry out a highly accurate nondestructive measurement of the amount of curl even in a case where the amount of curl is relatively large, without having to cut a sample from the long separator sheet.

Furthermore, the long separator sheet unwound from the separator roll, after the measurement of the width (i.e., distance between the opposite edges, each extending parallel to the lengthwise direction of the long separator sheet, of the long separator sheet), is wound around the third roller.

[Note]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention is applicable to measurement of amount of curl, and the like.

REFERENCE SIGNS LIST

1 Lithium-ion secondary battery
4 Heat-resistant layer
5 Porous film
6 Slitting apparatus
7 Slitting section (cutting apparatus)
10a Optical width measuring apparatus (measuring apparatus)
10b Optical width measuring apparatus (measuring apparatus)
12 Separator
12a Long separator sheet
12b Long separator sheet
12U Separator roll
12L Separator roll
12O Separator original sheet
66 Roller (transferring section)
68U Roller (transferring section)
68L Roller (transferring section)
69U Roller (transferring section)
69L Roller (transferring section)
70U First wind-up roller (winding section)
70L Second wind-up roller (winding section)
83U First take-up assisting roller (transferring section)
83L Second take-up assisting roller (transferring section)
100 Separator roll
101 Long separator sheet
102 Core
103 First roller
104 Stopper
105 Second roller
106 Second roller
107 Weight (tension applying part)
110 Curl amount measuring apparatus
113 First roller
114 Second roller
115 Second roller
116 Third roller (tension applying part)
117 Separator roll
120 Curl amount measuring apparatus
1 Core
u Core
MD Lengthwise direction of long separator sheet or of separator original sheet
TD Transverse direction of long separator sheet or of separator original sheet

The invention claimed is:

1. A method of measuring an amount of curl in a separator, comprising:
a step of, in regard to at least one of long separator sheets which resulted from slitting of a separator original sheet along a lengthwise direction of the separator original sheet, measuring an amount of curl at an edge of the at least one of the long separator sheets while applying tension to the at least one of the long separator sheets in a lengthwise direction of the at least one of the long separator sheets, the edge being parallel to the lengthwise direction of the at least one of the long separator sheets.

2. The method according to claim 1, comprising:
a slitting step comprising slitting the separator original sheet along the lengthwise direction of the separator original sheet into the long separator sheets; and
a winding step comprising winding the long separator sheets around respective cores,
the step of measuring comprising measuring, while the long separator sheets are being transferred from the slitting step to the winding step, the amount of curl at the edge of the at least one of the long separator sheets while applying tension to the at least one of the long separator sheets in the lengthwise direction of the at least one of the long separator sheets.

3. The method according to claim 1, wherein: the at least one of the long separator sheets is at least one long separator sheet unwound from at least one of separator rolls in which the long separator sheets are wound around respective cores; and the step of measuring comprises measuring the amount of curl at the edge of the at least one long separator sheet while applying tension to the at least one long separator sheet in the lengthwise direction of the at least one long separator sheet.

4. The method according to claim 1, wherein the step of measuring comprises measuring the amount of curl throughout the edge of the at least one of the long separator sheets.

5. The method according to claim 1, wherein the step of measuring comprises measuring the amount of curl with use of an optical width measuring apparatus.

6. The method according to claim 1, wherein the amount of curl is a difference between (i) a slit width of the at least one of the long separator sheets, the slit width being orthogonal to the lengthwise direction of the at least one of the long separator sheets and being a designed value, and (ii) a first width of the at least one of the long separator sheets, the first width being orthogonal to the lengthwise direction of the at least one of the long separator sheets and having been measured while applying tension to the at least one of the long separator sheets in the lengthwise direction of the at least one of the long separator sheets.

7. The method according to claim 1, wherein the amount of curl is a difference between (i) a second width of the at least one of the long separator sheets, the second width being orthogonal to the lengthwise direction of the at least one of the long separator sheets and having been measured while curl at the edge of the at least one long separator sheets is stretched out, and (ii) a first width of the at least one of the long separator sheets, the first width being orthogonal to the lengthwise direction of the at least one of the long separator sheets and having been measured while applying tension to the at least one of the long separator sheets in the lengthwise direction of the at least one of the long separator sheets.

8. The method according to claim 1, wherein the at least one of the long separator sheets is at least one long separator sheet obtained from a central portion of the separator original sheet, the central portion being positioned at a center in a direction orthogonal to the lengthwise direction of the separator original sheet.

9. A slitting apparatus comprising:
a slitting section configured to slit a separator original sheet along a lengthwise direction of the separator original sheet into long separator sheets; and
a winding section configured to wind the long separator sheets around respective cores,
the slitting apparatus comprising:
a transferring section configured to transfer the long separator sheets from the slitting section to the winding section while tension is being applied to the long separator sheets in a lengthwise direction of the long separator sheets; and
a measuring apparatus configured to measure, in the transferring section, a width of at least one of the long separator sheets, the width being a distance between opposite edges, each of which extends parallel to the lengthwise direction of the at least one of the long separator sheets, of the at least one of the long separator sheets.

10. The slitting apparatus according to claim 9, wherein, in the transferring section, the measuring apparatus is located at a position through which the at least one of the long separator sheets is transferred, the at least one of the long separator sheets being at least one long separator sheet obtained from a central portion of the separator original sheet, the central portion being positioned at a center in a direction orthogonal to the lengthwise direction of the separator original sheet.

11. The slitting apparatus according to claim 9, wherein:
the measuring apparatus is an optical width measuring apparatus;
the width of the at least one of the long separator sheets is a projection width of the at least one of the long separator sheets measured with use of the optical width measuring apparatus, the projection width being orthogonal to the lengthwise direction of the at least one of the long separator sheets; and
an amount of curl is a difference between (i) a slit width that is orthogonal to the lengthwise direction of the separator original sheet, the slit width being determined by the slitting section, and (ii) the projection width.

12. A curl amount measuring apparatus comprising:
a first roller for attaching a separator roll thereon, the separator roll being constituted by (i) a core and (ii) a long separator sheet, which resulted from slitting of a separator original sheet along a lengthwise direction of the separator original sheet, wound around the core;
a third roller configured to wind therearound the long separator sheet unwound from the separator roll while applying tension to the long separator sheet in a lengthwise direction of the long separator sheet; and
a measuring apparatus configured to measure a width of the long separator sheet unwound from the separator roll while tension is being applied to the long separator sheet in the lengthwise direction of the long separator sheet, the width being a distance between opposite edges, each of which extends parallel to the lengthwise direction of the long separator sheet, of the long separator sheet.

* * * * *